(12) United States Patent
Xu et al.

(10) Patent No.: US 11,609,946 B2
(45) Date of Patent: Mar. 21, 2023

(54) DYNAMIC SEARCH INPUT SELECTION

(71) Applicant: Pinterest, Inc., San Francisco, CA (US)

(72) Inventors: Kelei Xu, Mountain View, CA (US); Naveen Gavini, San Francisco, CA (US); Yushi Jing, San Francisco, CA (US); Andrew Huan Zhai, Berkeley, CA (US); Dmitry Olegovich Kislyuk, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 304 days.

(21) Appl. No.: 14/875,010

(22) Filed: Oct. 5, 2015

(65) Prior Publication Data
US 2017/0097945 A1 Apr. 6, 2017

(51) Int. Cl.
*G06F 16/58* (2019.01)
*G06F 16/54* (2019.01)
(Continued)

(52) U.S. Cl.
CPC ...... *G06F 16/5866* (2019.01); *G06F 3/04812* (2013.01); *G06F 3/04842* (2013.01); *G06F 3/04886* (2013.01); *G06F 16/532* (2019.01); *G06F 16/538* (2019.01); *G06F 16/54* (2019.01); *G06K 9/6201* (2013.01); *G06F 2203/04803* (2013.01); *G06F 2203/04804* (2013.01); *G06V 10/759* (2022.01)

(58) Field of Classification Search
CPC .... G06F 16/5866; G06F 16/532; G06F 16/54; G06F 16/248; G06F 16/24578; G06F 3/04812; G06F 3/04842; G06F 3/04886; G06F 2203/04803; G06F 2203/04804; G06F 16/538; G06K 9/6201; G06K 2009/6213
See application file for complete search history.

(56) References Cited

U.S. PATENT DOCUMENTS 5,579,471 A 11/1996 Barber et al.
5,596,690 A 1/1997 Stone et al.
(Continued)

FOREIGN PATENT DOCUMENTS

CA 2495046 A1 2/2004
EP 2420941 A1 2/2012
(Continued)

OTHER PUBLICATIONS

Extended European Search Report for EP Application No. 14863014.8 dated Mar. 30, 2017.
(Continued)

*Primary Examiner* — Charles D Adams
(74) *Attorney, Agent, or Firm* — Athorus, PLLC

(57) ABSTRACT

Described is a system and method for enabling dynamic selection of a search input. For example, rather than having a static search input box, the search input may be dynamically positioned such that it encompasses a portion of displayed information. An image segment that includes a representation of the encompassed portion of the displayed information is generated and processed to determine an object represented in the portion of the displayed information. Additional images with visually similar representations of objects are then determined and presented to the user.

19 Claims, 15 Drawing Sheets

(51) Int. Cl.
*G06F 16/532* (2019.01)
*G06F 16/538* (2019.01)
*G06F 3/04812* (2022.01)
*G06F 3/04842* (2022.01)
*G06F 3/04886* (2022.01)
*G06K 9/62* (2022.01)
*G06V 10/75* (2022.01)

(56) References Cited

U.S. PATENT DOCUMENTS

| | | |
|---|---|---|
| 6,446,081 B1 | 9/2002 | Preston |
| 7,117,519 B1 | 10/2006 | Anderson et al. |
| 8,185,526 B2* | 5/2012 | Wen .................. G06F 16/5838 707/730 |
| 8,190,604 B2 | 5/2012 | Wen et al. |
| 3,280,881 A1 | 10/2012 | Zhou et al. |
| 8,352,465 B1* | 1/2013 | Jing .................. G06F 17/30867 707/723 |
| 8,412,594 B2 | 4/2013 | Kundu |
| 8,429,168 B1 | 4/2013 | Chechik et al. |
| 8,909,563 B1 | 12/2014 | Jing et al. |
| 8,983,941 B1 | 3/2015 | Murphy-Chutorian et al. |
| 9,087,078 B2* | 7/2015 | Becherer .......... G06F 17/30247 |
| 9,098,741 B1 | 8/2015 | Anguelov et al. |
| 9,143,573 B2* | 9/2015 | Barak ................ G06K 9/00295 |
| 9,177,225 B1 | 11/2015 | Cordova-Diba et al. |
| 9,443,314 B1 | 9/2016 | Huang et al. |
| 9,477,649 B1 | 10/2016 | Davidson et al. |
| 9,734,167 B2* | 8/2017 | Croteau ................. G06F 16/29 |
| 9,798,949 B1* | 10/2017 | Du ........................... G06K 9/46 |
| 9,904,949 B1 | 2/2018 | Tavernier |
| 10,025,477 B1 | 7/2018 | Khafizova |
| 10,043,109 B1 | 8/2018 | Du et al. |
| 10,262,060 B1 | 4/2019 | Zeiler et al. |
| 10,540,378 B1 | 1/2020 | Hsiao et al. |
| 10,824,942 B1 | 11/2020 | Bhotika et al. |
| 2002/0174120 A1 | 11/2002 | Zhang et al. |
| 2004/0013286 A1 | 1/2004 | Viola et al. |
| 2005/0031165 A1 | 2/2005 | Olson et al. |
| 2005/0225678 A1 | 10/2005 | Zisserman et al. |
| 2006/0018521 A1 | 1/2006 | Avidan |
| 2006/0112092 A1 | 5/2006 | Ziou et al. |
| 2006/0251292 A1 | 11/2006 | Gokturk et al. |
| 2007/0071323 A1 | 3/2007 | Kontsevich et al. |
| 2007/0101295 A1 | 5/2007 | Ding et al. |
| 2007/0177805 A1 | 8/2007 | Sallagher |
| 2007/0286531 A1 | 12/2007 | Fu et al. |
| 2008/0204569 A1 | 8/2008 | Miller et al. |
| 2008/0226119 A1 | 9/2008 | Candelore et al. |
| 2009/0208116 A1* | 8/2009 | Gokturk ............ G06F 17/30259 382/209 |
| 2009/0282025 A1* | 11/2009 | Winter ............... G06F 17/30256 |
| 2010/0082597 A1 | 4/2010 | Retterath et al. |
| 2010/0106732 A1 | 4/2010 | Atallah et al. |
| 2010/0205142 A1 | 8/2010 | Feulner et al. |
| 2010/0205202 A1 | 8/2010 | Yang et al. |
| 2010/0226564 A1 | 9/2010 | Marchesotti et al. |
| 2011/0013049 A1 | 1/2011 | Thörn |
| 2011/0029561 A1 | 2/2011 | Slaney et al. |
| 2011/0081090 A1 | 4/2011 | Bouguet et al. |
| 2011/0119260 A1 | 5/2011 | Hu et al. |
| 2011/0125735 A1* | 5/2011 | Petrou .................. G06F 16/5838 707/723 |
| 2011/0128288 A1 | 6/2011 | Petrou et al. |
| 2011/0184950 A1* | 7/2011 | Skaff ................. G06F 17/30265 707/737 |
| 2011/0194761 A1 | 8/2011 | Wang et al. |
| 2011/0202543 A1 | 8/2011 | Chin et al. |
| 2011/0268323 A1 | 11/2011 | Gallagher |
| 2011/0320317 A1 | 12/2011 | Yuan et al. |
| 2012/0030227 A1 | 2/2012 | Mital et al. |
| 2012/0123976 A1 | 5/2012 | Wang et al. |
| 2012/0194681 A1 | 8/2012 | Atsmon et al. |
| 2012/0294520 A1 | 11/2012 | Mei et al. |
| 2013/0007620 A1 | 1/2013 | Barsook et al. |
| 2013/0060786 A1 | 3/2013 | Serrano et al. |
| 2013/0097181 A1 | 4/2013 | Sud et al. |
| 2013/0121600 A1 | 5/2013 | Lin et al. |
| 2013/0132236 A1 | 5/2013 | Gokturk et al. |
| 2013/0188886 A1 | 7/2013 | Petrou et al. |
| 2013/0282712 A1 | 10/2013 | Brandt |
| 2014/0035913 A1* | 2/2014 | Higgins .................. G06Q 30/00 345/420 |
| 2014/0046935 A1 | 2/2014 | Bengio et al. |
| 2014/0095479 A1 | 4/2014 | Chang et al. |
| 2014/0129370 A1* | 5/2014 | Mabrey .................. G06Q 50/01 705/26.5 |
| 2014/0129959 A1* | 5/2014 | Battles ............... G06Q 30/0251 715/751 |
| 2014/0188863 A1 | 7/2014 | Grauman et al. |
| 2014/0250110 A1 | 9/2014 | Yang et al. |
| 2015/0065803 A1* | 3/2015 | Douglas ............. A61B 1/00009 600/200 |
| 2015/0134688 A1 | 5/2015 | Jing et al. |
| 2015/0142787 A1 | 5/2015 | Kimmerling |
| 2015/0154691 A1* | 6/2015 | Curry ...................... G06F 30/23 705/27.2 |
| 2015/0170333 A1* | 6/2015 | Jing ......................... G06T 3/40 345/660 |
| 2015/0178317 A1 | 6/2015 | Spielberg |
| 2015/0234918 A1* | 8/2015 | Becherer .......... G06F 17/30651 707/722 |
| 2015/0248429 A1 | 9/2015 | Pregueiro et al. |
| 2015/0294185 A1* | 10/2015 | Cady ..................... G06F 16/51 382/195 |
| 2015/0324365 A1* | 11/2015 | Becker .............. G06F 17/30554 707/723 |
| 2015/0339391 A1 | 11/2015 | Kang et al. |
| 2016/0005171 A1 | 1/2016 | Watanabe et al. |
| 2016/0070809 A1 | 3/2016 | Rathus |
| 2016/0225053 A1 | 8/2016 | Romley et al. |
| 2016/0342313 A1 | 11/2016 | Gross et al. |
| 2017/0097945 A1 | 4/2017 | Xu et al. |
| 2017/0098152 A1* | 4/2017 | Kerr ......................... G06N 3/02 |
| 2017/0155631 A1 | 6/2017 | Du |
| 2017/0293859 A1 | 10/2017 | Gusev et al. |

FOREIGN PATENT DOCUMENTS

| | | |
|---|---|---|
| JP | H07131653 A | 5/1995 |
| JP | 2005250797 A | 9/2005 |
| JP | 2010250426 A1 | 11/2010 |
| JP | 2011154687 A | 8/2011 |
| JP | 2013041332 A | 2/2013 |
| JP | 2013127809 A | 6/2013 |
| JP | 2015096148 A | 5/2015 |
| JP | 2015143951 A | 8/2015 |
| WO | 2014025592 A1 | 2/2014 |

OTHER PUBLICATIONS

International Search Report and Written Opinion for PCT Application No. PCT/US2016/031914 dated Aug. 16, 2016.
International Search Report and Written Opinion for PCT Application No. PCT/US2016/055212 dated Dec. 23, 2016.
International Search Report for PCT Application No. PCT/US2014/064871, dated Feb. 6, 2015.
Extended European Search Report for EP Application No. 16854145.6, dated Apr. 11, 2019.
Ze-Lian Li et al: "Content-Based Retrieval in Digital Libraries", In: "Fundamentals of Multimedia", Dec. 31, 2004 (Dec. 31, 2004), Pearson Prentice Hall, pp. 531-578, 531-532, and 521; figure 18.8.
Jaworska, "A Search-Engine Concept Based on Multi-feature Vectors and Spatial Relationship", International Conference on Simulation, Modeling, and Programming for Autonomous Robots, SIMPAR 2010; [Lecture Notes in Computer Science; Lect.Notes Computer], Oct. 26, 2011 (Oct. 26, 2011), pp. 137-148.
Scheuer, John Davenport, "Dynamic Drive DHTML Scripts—Featured Image Zoomer", Sep. 28, 2015 (Sep. 28, 2015), XP055731727,

(56) References Cited

OTHER PUBLICATIONS

Retrieved from the Internet URL: https://web.archive.org/web/20150928012328/http://www.dynamicdrive.com/dynamicindex4/featuredzoomer.htm [retrieved on Sep. 17, 2020], 7 pages.

* cited by examiner

DYNAMIC SEARCH INPUT SELECTION

BACKGROUND

With the ever expanding amount of accessible digital content available to users and customers, it continues to become more and more difficult to discover the content for which the user is searching. Several different search techniques exist, such as keyword searching, but there are many inefficiencies in such systems.

BRIEF DESCRIPTION OF THE DRAWINGS

The detailed description is described with reference to the accompanying figures.

Figure 1:
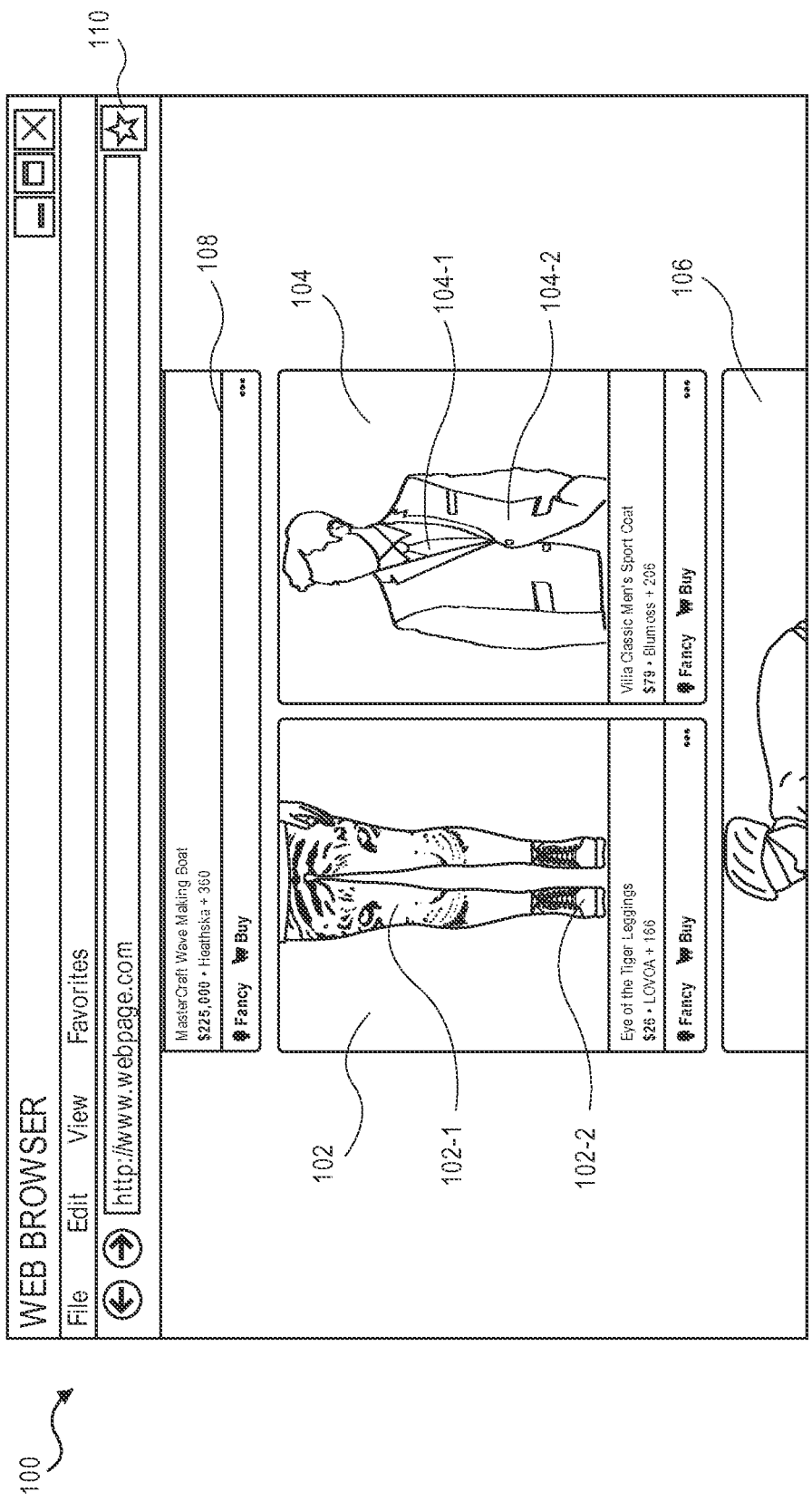
FIGS. 1-6 are representations of a graphical user interface for selecting an object of interest using a dynamic search control, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described herein are systems and methods that facilitate searching for information based on a selection of a portion of a larger image. Rather than attempting to process an entire image and/or requiring a search input (image, keyword(s), etc.) be provided at a statically positioned search control, the described systems and methods provide a dynamically positionable search control that may be positioned over any portion of displayed information. For example, the search control may be visually presented such that it appears to overlay the displayed information presented on a user interface and encompasses a portion of the displayed information. A user may move or alter the position of the search control and/or adjust the size of the search control. As the user moves the search control and/or alters the size of the search control, additional images similar to an object encompassed by the search control are determined and presented to the user. As the user continues to move and/or alter the size of the search control, the additional images are updated so that they correspond with the object represented in the portion of the displayed information that is encompassed by the search control.

When the search control is at a desired position (e.g., the user stops moving and/or altering the size of the search control), in addition to presenting additional images that are visually similar and/or include a representation of a visually similar object to the representation of the object encompassed by the search control, one or more keywords may be presented to the user. The keywords may be selected to alter which additional images are determined for presentation to the user.

A user may interact with the keywords and/or the presented additional images. For example, a user may select one or more of the keywords and the presentation of the additional images will be updated to present additional images that correspond to the keyword and that are visually similar to the portion of the displayed information encompassed by the search control. Likewise, the user may interact with the presented additional images, such as by viewing, selecting, etc., the additional images. When an additional image is selected, the user may be presented with one or more actions associated with the selected additional image that may be initiated. Example actions include, but are not limited to, initiating a purchase of an object represented in the image, sharing the image, saving the image, emailing the image, obtaining additional information about the image and/or the object represented in the image, etc.

By providing a dynamically positionable search control, a user can select a portion of displayed information that is of interest, or that includes a representation of an object of interest, and receive search results that are relevant to that portion of the displayed information and/or object of interest, rather than having to search an entire image and/or receive results that may or may not be of interest to the user. Likewise, by updating the presented additional images as the user moves the search control, the user can explore, in a systematic fashion, the displayed information and view on an object-by-object basis additional images that include representations of objects that are visually similar to those included in the displayed information.

FIGS. 1-6 are representations of user interfaces for dynamically positioning a search control and selecting an object of interest, according to an implementation. A user may be presented with a graphical user interface via a client device that includes displayed information. A client device may include, for example, personal computers, tablet computers, eBook reader devices, laptop computers, desktop computers, netbooks, personal digital assistants (PDA), portable gaming devices, wireless communication devices, such as smart phones or mobile handsets, set-top boxes, game consoles, cameras, or any combination thereof. Utilizing a client device, a user may interact with the displayed information.

Turning first to FIG. 1, illustrated is a user interface 100 that includes displayed information, such as an image of Tiger Leggings 102, an image of a man in a suit 104, a portion of an image 106, and a portion of an image 108. As will be appreciated, the displayed information may be any type, style, quantity, etc., of information that can be visually presented to a user. For example, displayed information may include images, videos, text, web pages, email, word documents, presentations, spreadsheets, etc., or any combination thereof.

When a user is searching for information and/or items, they are often only interested in specific objects or portions of the displayed information represented on the user interface 100. For example, a user may only be interested in leggings 102-1, the shoes 102-2, the man's necktie 104-1, the man's suit jacket 104-2, etc. To obtain additional information and/or additional images that include visually similar objects to those of interest, a user may initiate or invoke the dynamic search control by selecting the search control icon 110.

Figure 2:
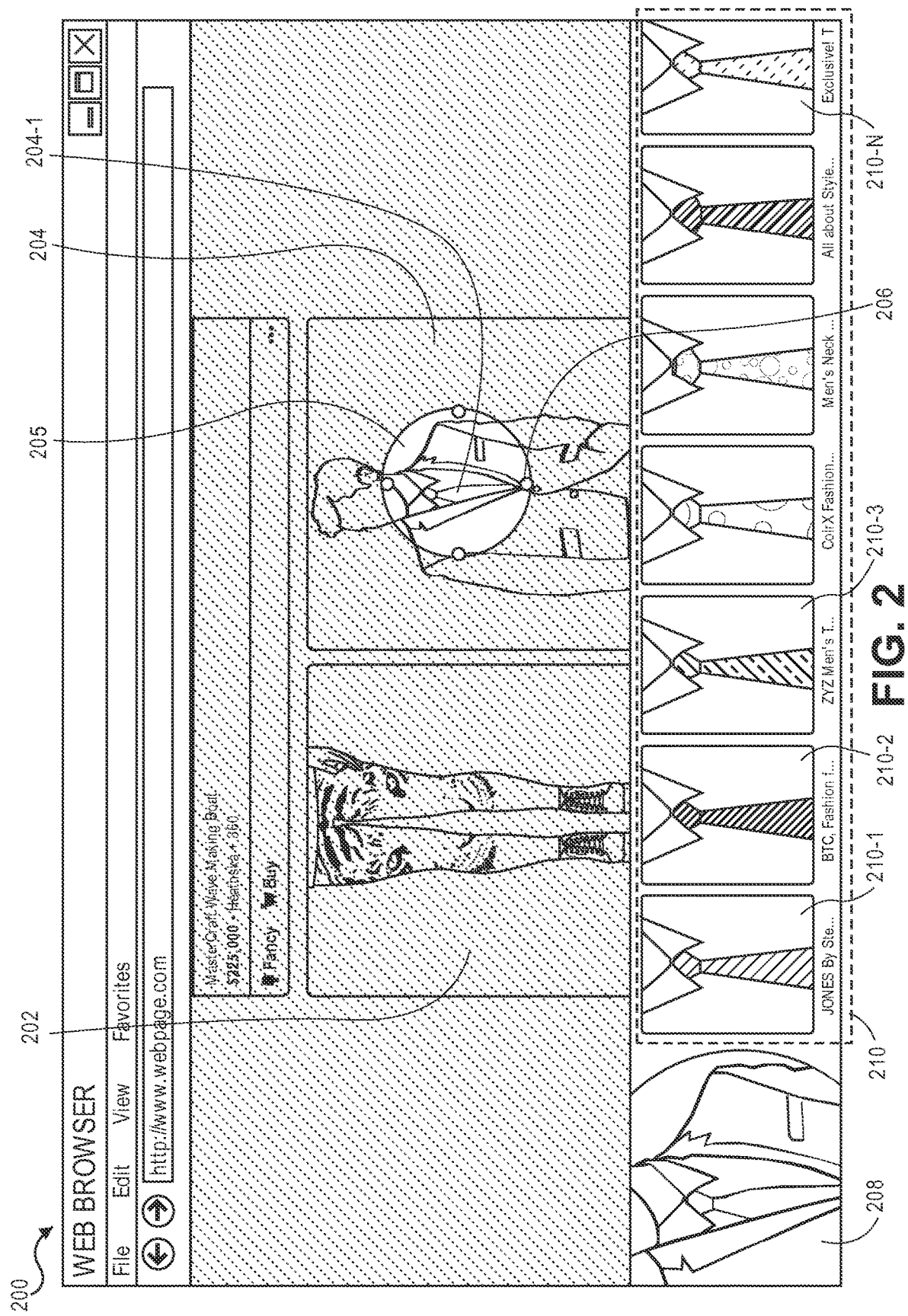

Upon selecting the search control icon 110, the search control is visually presented on the user interface 100. For example, FIG. 2 illustrates a graphical user interface 200, which corresponds to the user interface 100, with the dynamic search control 205 activated. As illustrated, the dynamic search control 205 is visually presented concurrently with the displayed information such that the dynamic search control visually appears to be presented over the displayed information and encompassing less than all of the displayed information.

A user may interact with the dynamic search control by moving it around on the user interface 200, adjusting the size of the search control, etc. As the user adjusts the search control (e.g., moves and/or alters the size of the search control), additional images 210 are determined and presented to the user. As illustrated in FIG. 2, the user has positioned the search control over the image 204 of the man in the suit and adjusted the size of the search control 205 so that it primarily encompasses the necktie 204-1 represented in the image 204. The displayed information that is not encompassed by the dynamic search control 205, such as the image 202 of the leggings, may be obfuscated or greyed out, or otherwise distinguished from the search control 205.

The dynamic search control may be of any size or shape and may be dynamically positioned at any location on the user interface 200. In this example, the dynamic search control 205 is substantially circular and the radius of the substantially circular shape may be increased or decreased using the size controls 206. In other implementations, the dynamic search control may be of any size and/or shape. For example, the dynamic search control 205 may be square, rectangular, octagonal, elliptical, or any other polygonal shape or other shape that encompasses a portion of the displayed information.

A user may adjust the size and/or position of the search control 205 by interacting with the search control. For example, if the client device upon which the displayed information is presented includes a touch sensitive display, a user may alter the position and/or size of the search control by touching or otherwise interacting with the touch sensitive display and moving the search control to a desired position on the user interface and/or adjusting the search control to a desired size. Other forms of adjustment may likewise be utilized, including but not limited to voice control, mouse, keyboard, etc.

In this example, the user has adjusted the size of the search control 205 and positioned the search control 205 such that it encompasses a portion of the image 204 that includes the necktie 204-1. As illustrated, the portion of the displayed information presented on the user interface 200 that is encompassed by the search control 205 is distinguished from the other portions of the displayed information.

As the user moves the search control over different portions of the displayed information, an image segment that includes the encompassed portion of the displayed information is generated. As discussed further below with respect to FIGS. 9 and 10, in some implementations, an image of the entire displayed information may be obtained and cached on the client device. As the search control is moved, the position of the search control is utilized to obtain corresponding image segments from the cached image of the displayed information. In other implementations, the page information (e.g., uniform resource locator, image signature) and the search control position information may be sent to a remote computing resource and the remote computing resource may utilize that information to generate an image segment. The image segment includes the portion of the displayed information that is encompassed by the search control.

Image segments may be periodically generated as the search control is moved and/or otherwise adjusted. In some implementations, image segments may be generated at defined intervals (e.g., every second, every two seconds) as the search control is being moved or adjusted. In other implementations, a frequency of image segment generation may be based on a speed and/or direction in which the search control is moving, based on a size of the search control, based on color variations in the displayed information, based on user settings or preferences, etc. In other implementations, an image segment may not be obtained until it is determined that the search control 205 is at a desired position and/or size. For example, it may be determined that the search control is at a desired position by, for example, determining that a defined amount of time (e.g., 2 seconds) has elapsed without any alteration of the position and/or size of the search control 205, in response to receiving an indication from a user (e.g., the user releasing a mouse button or removing a touch input from a touch sensitive screen), etc.

As each image segment is generated, the image segment is processed to determine an object represented in the image segment, referred to herein as an object of interest, and other additional images that include visually similar objects, and/or that are visually similar to the image segment, are determined Processing the image segment and determining additional, visually similar images is discussed in further detail below with respect to FIG. 11.

The visually similar images are presented to the user as additional images 210. In this example, a portion of the image segment 208 corresponding to the displayed information that is encompassed by the search control 205 is presented concurrently with the additional images 210 as part of the user interface 200. Any number of additional images 210 may be presented. In this example, there are seven additional images 210-1, 210-2, 210-3-210-N presented on the user interface 200 that are determined to be visually similar to the object represented in the portion of the displayed information that is encompassed by the search control 205. In other implementations, there may be fewer or more additional images presented on the user interface 200.

Additional images that are determined to include a representation of an object that is visually similar to the selected object of interest may, in some implementations, be ranked and those having the highest rank (e.g., based on visual similarity to the selected object of interest) are presented as the additional images 210.

Figure 3:
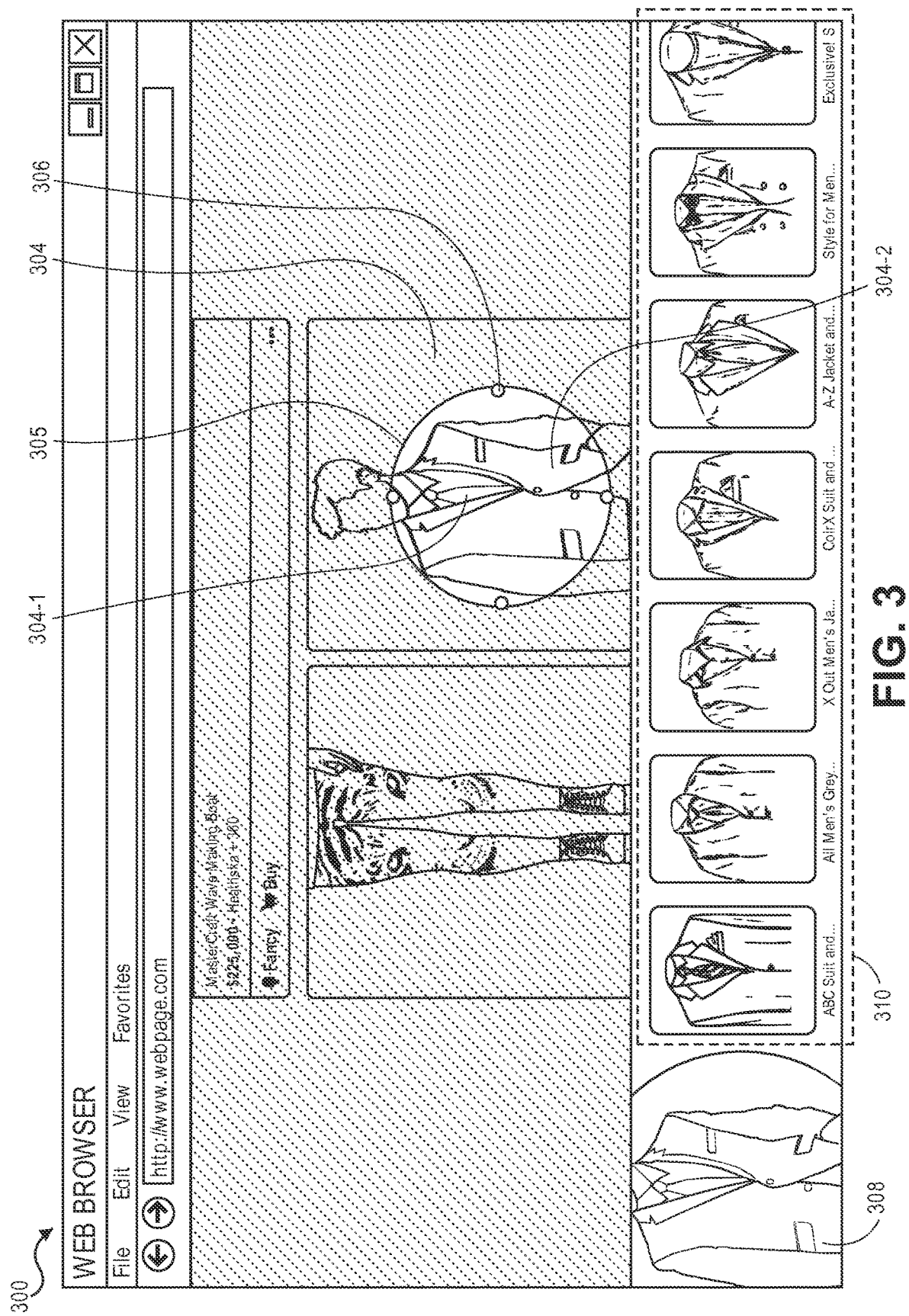

As the user moves or otherwise alters the search control 205, additional image segments are generated and processed and additional images corresponding to the representation of the object encompassed by the search control are presented to the user. For example, FIG. 3 illustrates a user interface 300 in which the user has altered the size and position of the search control 305 from the representation of the necktie, as illustrated in FIG. 2, such that the search control 305 encompasses the representation of the suit jacket 304-2. Specifically, in this example, the user has increased the radius of the search control 305 by manipulating the size controls 306 and adjusted the position of the search control 305. An image segment is generated that includes the portion of the displayed information that is encompassed by the search control 305. The image segment is then processed and it is determined that the object of interest represented in the image segment is the men's suit jacket. In this example, even though there are multiple representations of objects encompassed by the search control, namely the representation of the suit jacket 304-2 and the representation of the necktie 304-1, the processing may determine that the object of interest is the suit jacket. This determination may be based on the size and/or position of the search control, user preferences, and/or other information. In other implementations, each object represented in the image segment may be determined.

As discussed above, based on the object represented in the image segment, additional images 310 with visually similar representations of objects are determined and presented to the user. Likewise, a representation of the image segment 308 may also be presented to the user concurrently with the additional images.

Continuing with the example, as the user continues to alter the position and/or size of the search control, additional image segments are generated and processed and additional images corresponding to the represented object that is encompassed by the search control are determined and presented to the user. Updating the additional images as the user alters the position and/or size of the search control provides a real-time exploration of the displayed information and provides additional images that are relevant to the portion of the displayed information that is of interest to the user and encompassed by the search control.

Figure 4:
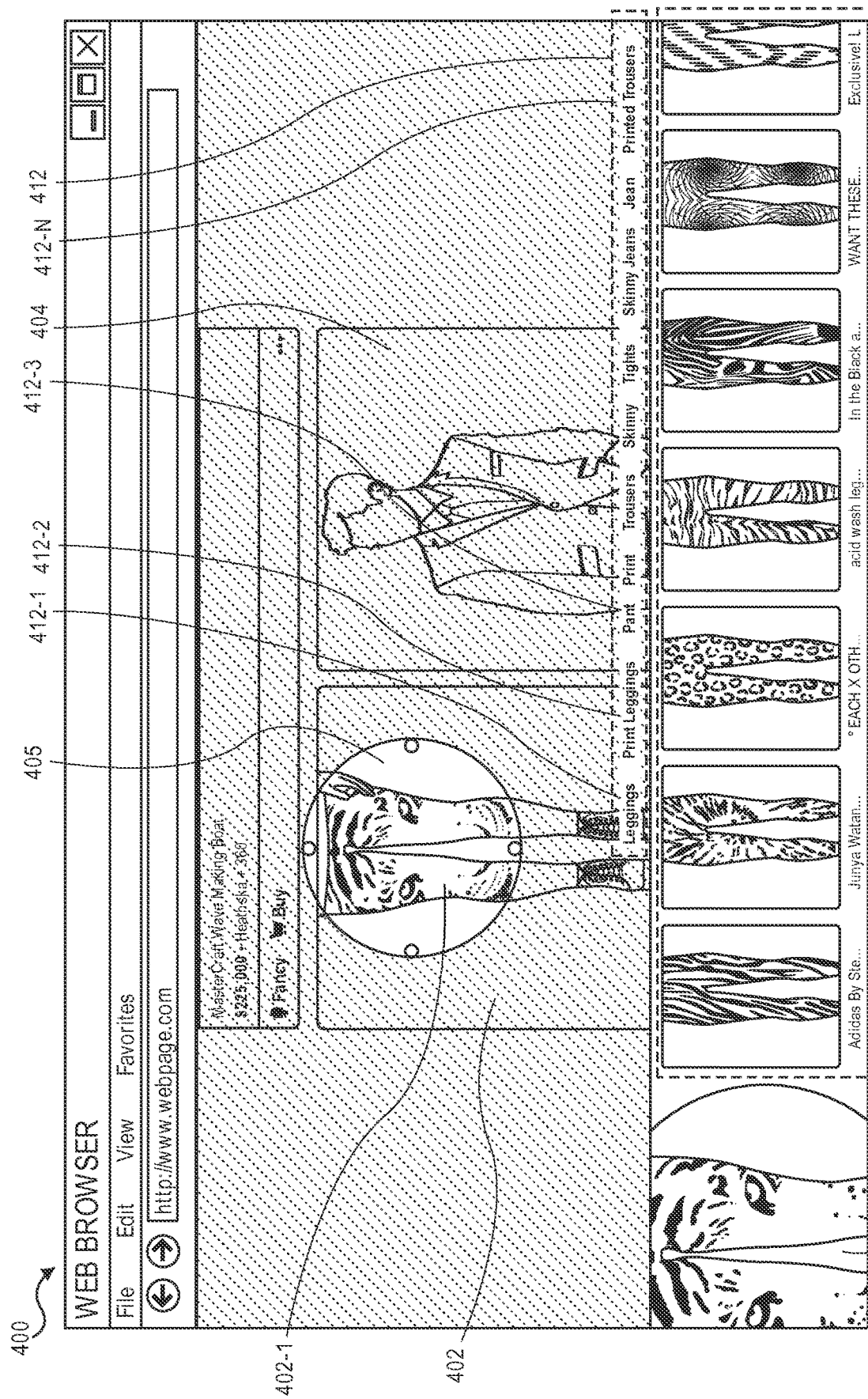

For example, turning to FIG. 4, the user has altered the position of the search control 405 such that it is positioned over the representation of the tiger leggings 402-1 included in the image 402 of the displayed information that is presented on the user interface 400. As discussed above, an image segment is generated that includes the portion of the displayed information encompassed by the search control 405 and that image segment is processed to determine the additional images 410 that are presented to the user as part of the user interface 400.

Figure 12:
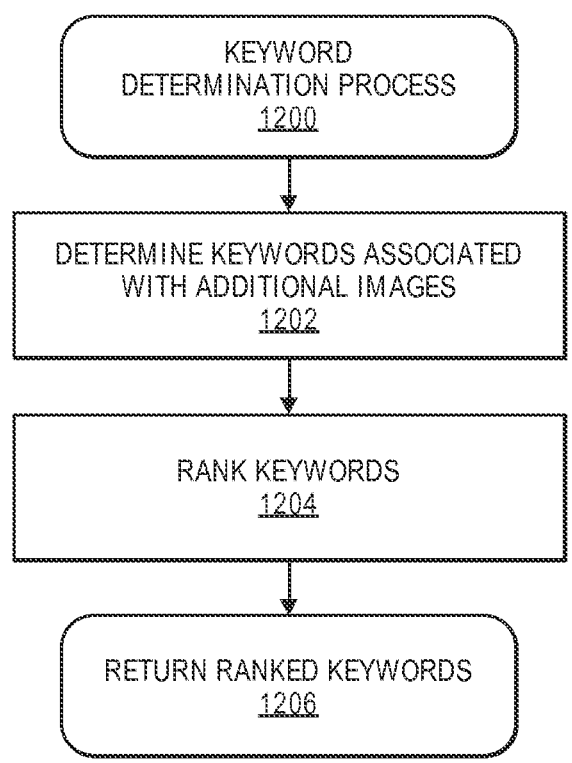
FIG. 12 is a flow diagram illustrating an example keyword determination process, according to an implementation.

In some implementations, in addition to presenting additional images 410, keywords 412 that correspond to the additional images may be presented. Like the additional images 410, any number of keywords 412 may be presented to the user for selection. As discussed further below with respect to FIG. 12, keywords may be associated with one or more of the additional images 410 and may be ranked based on the frequency with which the keywords are associated with the additional images. Keywords 412 with the highest frequency may be presented on the user interface. In this example, there are ten keywords 412-1, 412-2, 412-3-412-N that are presented on the user interface. In other implementations, there may be fewer or additional keywords presented on the user interface 400.

In some implementations, the keywords may only be presented when the search control has been stationary for a determined period of time (e.g., 2 seconds). In other implementations, the keywords may be presented at the same frequency as the additional images.

A user may select an additional image 410, select one or more of the keywords 412 and/or reposition or resize the search control 405. If the user repositions and/or resizes the search control 405, a new image segment is generated and additional images and/or keywords corresponding to that new image segment are determined and presented to the user. If the user selects one or more of the keywords 412, the order in which the additional images are presented is adjusted based on the selected keyword(s) and the similarity of the additional images with the image segment. Likewise, the order in which the keywords are presented may be updated based on the additional images that correspond to the selected keyword.

Figure 5:
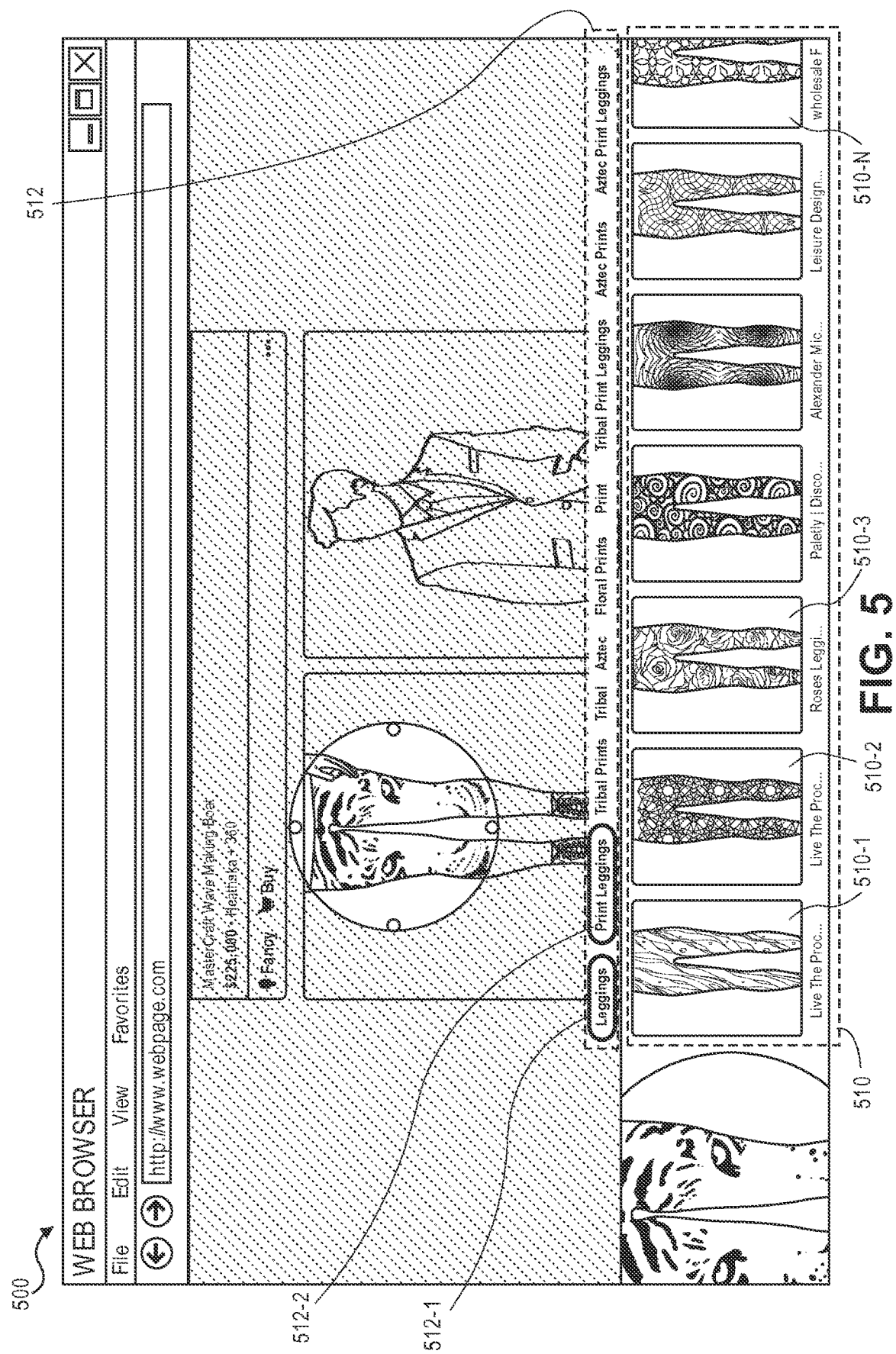
Figure 6:
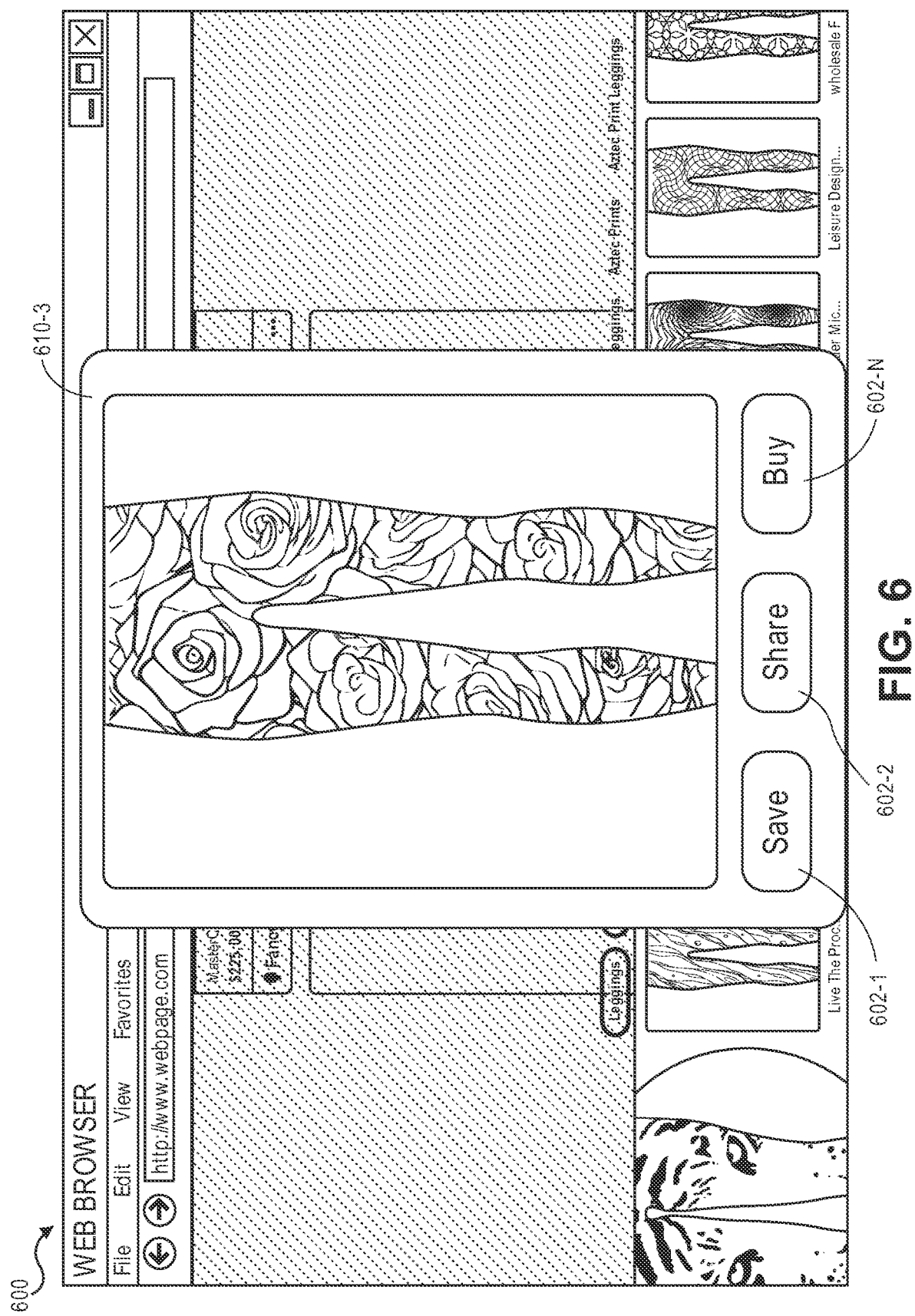

For example, FIG. 5 illustrates a user interface 500 in which the presentation of the order of the additional images 510 and the order of the keywords 512 is updated in response to selection of the two keywords 512-1, 512-2 of "Leggings" and "Print Leggings." As discussed further below with respect to FIG. 13, each time a keyword is selected, the additional images that are associated with the selected keywords are determined and re-ranked. In this example, the additional images in which both selected keywords 512-1, 512-2 are associated with the additional image are determined and ranked higher than other additional images. For the additional images that include both keywords, they are further ranked based on the similarity with the image segment. For example, the first two additional images 510-1 and 510-2 are each associated with both keywords 512-1, 512-2, and as such are ranked higher than the other additional images 510-3-510-N. Likewise, additional image 510-1 has a higher similarity to the image segment and is ranked higher than additional image 510-2. A user may continue selecting and/or un-selecting keywords and the presented order of the additional images 510 will be updated accordingly.

In some implementations, only additional images with selected keyword associations may be presented. In other implementations, as illustrated in FIG. 5, the additional images with the associated keywords may be ranked higher than other additional images that do not have the selected keywords associated therewith.

Based on the selected keywords and the additional images determined to be associated with the selected keywords, the order in which the keywords are presented may be adjusted. For example, as discussed further below with respect to FIG. 11, upon selection of a keyword, the additional images associated with the selected keyword are determined. Likewise, other keywords associated with those additional images may be determined and the keywords re-ranked so that keywords associated with the additional images that are associated with the already selected keyword may be ranked higher than keywords associated with additional images that do not have the already selected keyword associated therewith. The re-ranked keywords may then be presented to the user concurrently with the re-ranked additional images.

A user may also select an additional image 510 and obtain additional details and/or actions with respect to the selected additional image. For example, FIG. 6 includes a user interface 600 that is presented in response to a user selecting the additional image 510-3 (FIG. 5). As illustrated, the selected additional image is presented in a larger view as additional image 610-3. Likewise, one or more actions 602 that may be initiated with respect to the selected additional image are also presented. The additional actions include, but are not limited to, "Save" 602-1, "Share" 602-2, and "Buy" 602-N or purchase. In other implementations, there may be additional, fewer and/or different actions. Other actions that may be associated or initiated with respect to a selected additional image include, but are not limited to, a send action (e.g., email the additional image), a post action (e.g., post the additional image to a social website), etc.

A user may select one or more of the actions and the corresponding action is initiated with respect to the additional image. For example, if the user selects the "Buy" 602-N action, the action of purchasing the object represented in the additional image, or purchase of the additional image, is initiated. Initiation of the action may include obtaining additional details regarding the represented object, providing price information, seller information, shipping details, etc. As will be appreciated, any variety of actions may be associated with one or more of the additional images and those actions may be initiated with respect to a selected additional image.

Figure 7:
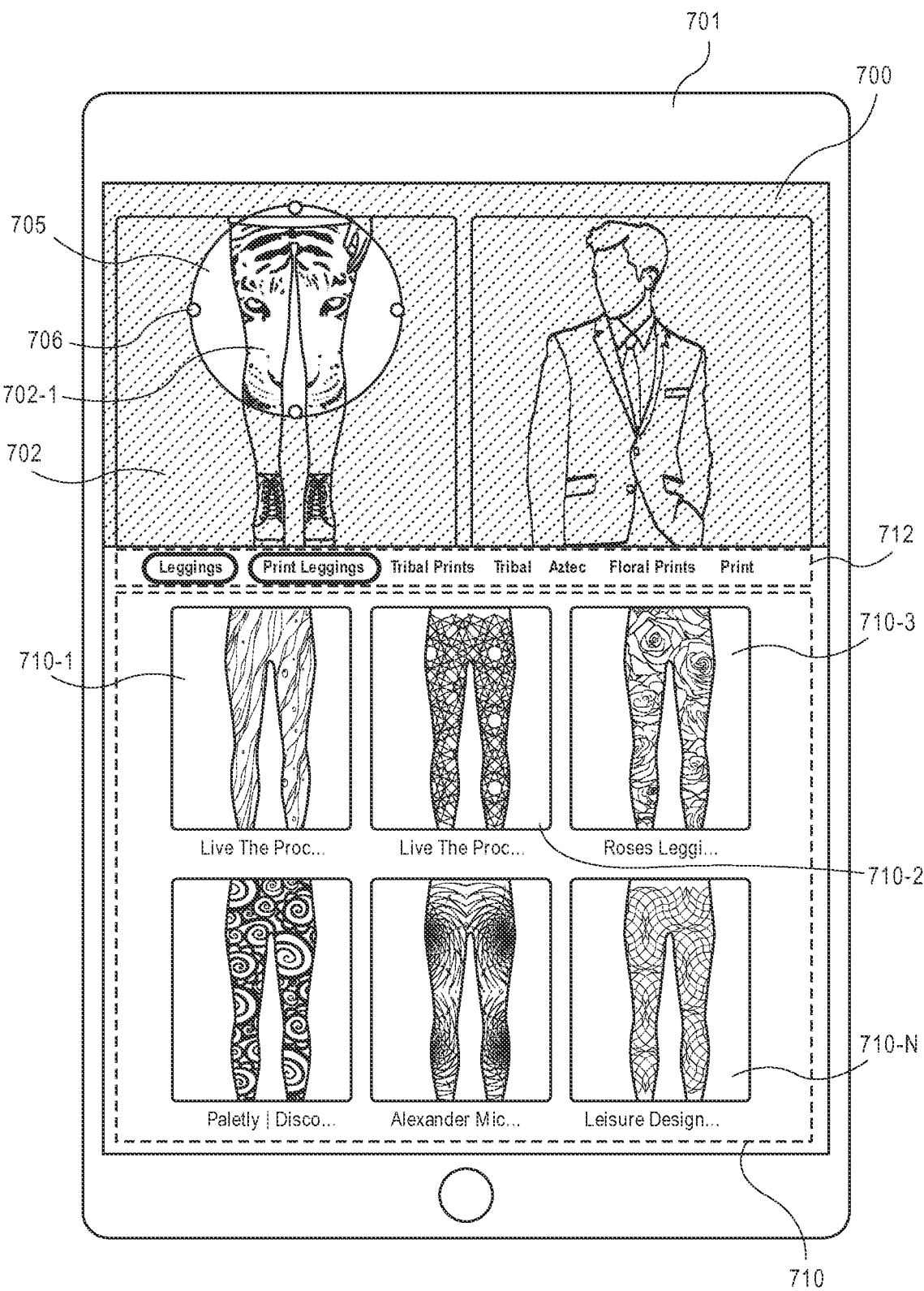
FIGS. 7-8 are representations of another graphical user interface for selecting an object of interest using a dynamic search control, according to an implementation.

FIG. 7 illustrates a user interface 700 presented on another client device, according to an implementation. This example user interface 700 corresponds to the user interface 500 (FIG. 5) and is presented on a different form factor client device 701. As with the above example, the user has positioned the search control 705 and adjusted the size of the search control using the size controls 706 such that the search control 705 is positioned to encompass the representation of the tiger leggings 702-1 presented in the image 702 that is included in the displayed information presented on the user interface 700 by the client device 701. Likewise, the user has selected the two keywords 712 "Leggings" and "Print Leggings." As discussed above, an image segment is generated that includes the portion of the displayed information that is encompassed by the search control 705, determined additional images 710, re-ranked those additional images 710 based on the selected keywords 712 and presented the re-ranked additional images 710 on the user interface 700 of the client device 701. In this example, additional image 710-1 corresponds to additional image 510-1, additional image 710-2 corresponds to additional image 510-2, additional image 710-3 corresponds to additional image 510-3, additional image 710-N corresponds to additional image 510-N, etc.

Figure 8:

Regardless of the user experience or the client device used, the implementations described herein enable a user to dynamically select portions of displayed information and obtain additional images that are visually similar to objects represented in the selected portion of the displayed information. The user may interact with those additional images, select presented keywords, continue to explore the displayed information by continuing to move the search control, etc. For example, referring to FIG. 8, like the above example, the user has selected the additional image 710-3 and is presented with additional image 810-3 along with actions 802-1, 802-2-802-N that may be initiated by the user.

Figure 9:
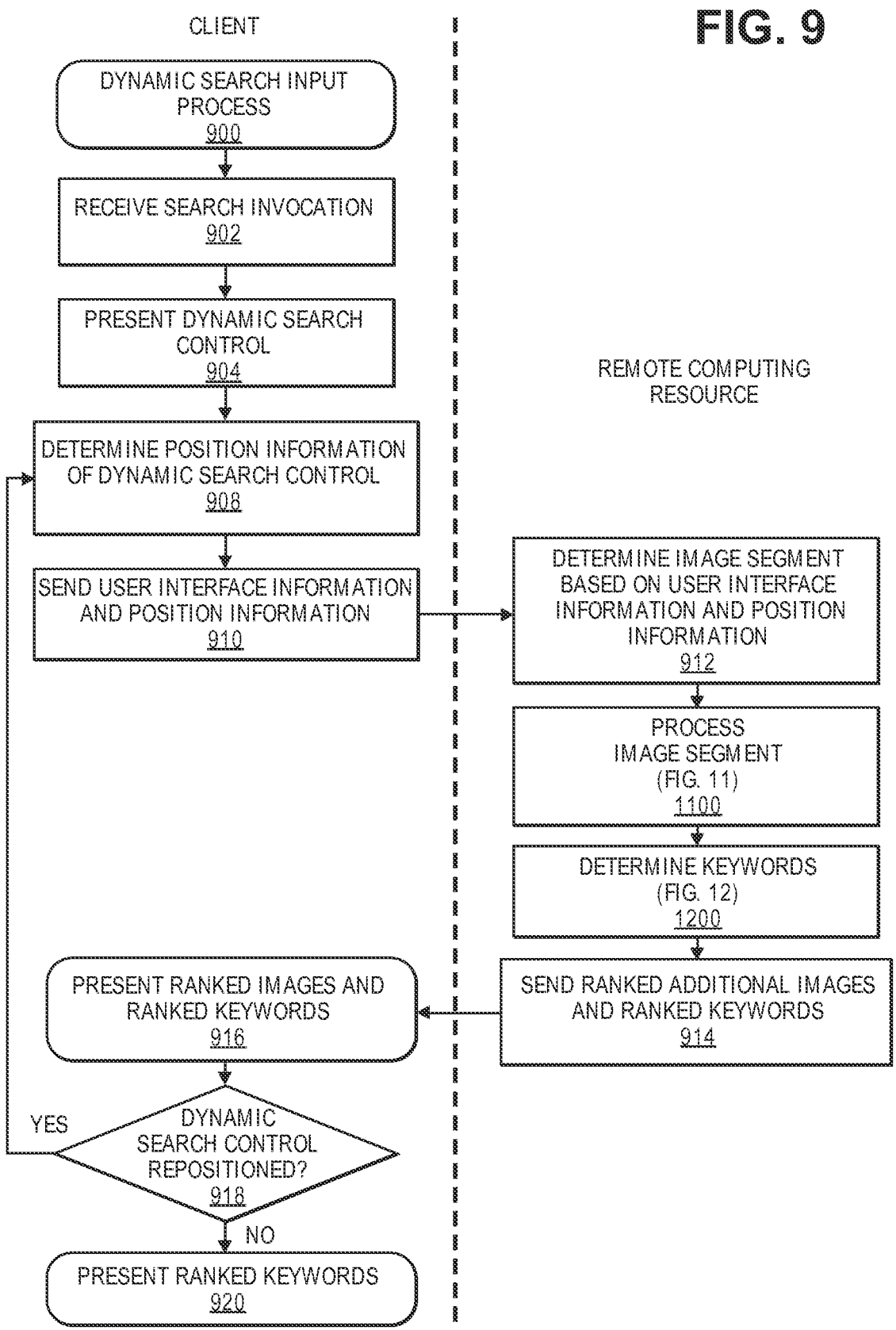
FIG. 9 is a flow diagram illustrating an example dynamic search process, according to an implementation.

FIG. 9 is a flow diagram illustrating an example dynamic search process 900, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include processes, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 900 begins upon receipt of an invocation or request to initiate a search using the dynamically adjustable search control, as in 902. Upon receiving an invocation, the dynamic search control is presented on a user interface such that it appears to be positioned over the displayed information that is presented on the user interface, as in 904. For example, a portion of the displayed information that is not encompassed by the search control may be obfuscated, greyed out, hidden from view, etc., such that the dynamic search control and the portion of the displayed information that is encompassed by the search control are distinguished. In other implementations, the portion of the displayed information that is encompassed by the search control may be highlighted, magnified, or otherwise distinguished from other portions of the displayed information so that a user can discern which portion of the displayed information is encompassed by the search control.

A user may interact with the search control by, for example, repositioning the search control to a different position on the user interface such that different portions of the displayed information are encompassed by the search control. Likewise, the size and/or shape of the search control may be altered such that more or less of the displayed information is encompassed by the search control.

As the search control is moved and/or the size adjusted, position information corresponding to the search control is determined, as in 908. The position information includes the size, shape and/or dimensions of the search control and the horizontal and vertical position of the search control on the user interface and/or with respect to the displayed information. For example, a center point of the search control may be determined, a horizontal and vertical position of the center point on the user interface determined, and dimensions (e.g., height, width, shape) of the search control determined with respect to the center point. In another example, the perimeter or perimeter points of the search control may be determined in horizontal and vertical positions with respect to the user interface.

The position information of the search control and the user interface information corresponding to the displayed information presented on the user interface are sent to a remote computing resource, as in 910. The user interface information may include, for example, a uniform resource locator (URL) of a web page that is presented as the displayed information on the user interface. As another example, the user interface information may include an image signature corresponding to an image within the displayed information that is partially encompassed by the search control. In such implementations, the remote computing resource maintains and/or has provided the displayed information that is presented on the client device. For example, the displayed information may correspond to a web page that has been sent or provided to a client device by the remote computing resource. Alternatively, the displayed information may have been provided by another device to the client device and to the remote computing resource. Regardless of the source, in the implementation discussed with respect to FIG. 9, the remote computing resource has information regarding the displayed information that is presented on the display of the client device.

The remote computing resource, upon receiving the user interface information and the position information of the search control, determines an image segment that corresponds to the portion of the displayed information encompassed by the search control, as in 912. For example, the remote computing resource may determine the displayed information and the position of the displayed information on the user interface based on the received user interface information. Likewise, the portion of the displayed information that is encompassed within the search control may be determined by overlaying the position information of the search control on the determined displayed information and the portion of the displayed information that is encompassed within the position information may be segmented out as an image segment.

The image segment is then processed to determine an object represented in the image segment and a plurality of additional images that include representations of objects that are visually similar to the object represented in the image segment, as in 1100. Processing of the image segment is discussed in further detail below with respect to FIG. 11. Likewise, one or more keywords that are associated with the additional images may also be determined, as in 1200. Determination of keywords is discussed in further detail below with respect to FIG. 12.

The ranked additional images that are returned by the example process 1100 and the ranked keywords that are returned by the example process 1200 are sent by the remote computing resource to the client device, as in 914. In some implementations, all of the additional images and/or additional keywords that are returned by the example process 1100 and the example process 1200 may be sent to the client device. In other implementations, only a portion of the additional images and/or additional keywords may be sent to the client device and the remote computing resource may maintain a record of all of the additional images and/or all of the additional keywords and an indication of which additional images and/or additional keywords have been sent to the client device.

Finally, the client device, upon receiving the additional images and/or additional keywords, presents the additional images, as in 916. In addition to presenting the additional images, a determination is made as to whether the dynamic search control has been repositioned, as in 918. If it is determined that the dynamic search control has been repositioned, the example process 900 returns to block 908 and continues, thereby updating the additional images that are presented to the user to correspond to the representation of the object encompassed by the repositioned search control. If it is determined that the dynamic search control has not been repositioned, the ranked keywords are presented to the user, as in 920. In some implementations, there may be a delay before it is determined that the search control has not been repositioned and before the keywords are presented. For example, the example process may include a two second delay before it is determined that the search control has not been repositioned and the keywords are presented. In some implementations, the image segment, the search control, and/or the displayed information may also be presented along with the additional images and/or additional keywords.

Figure 10:
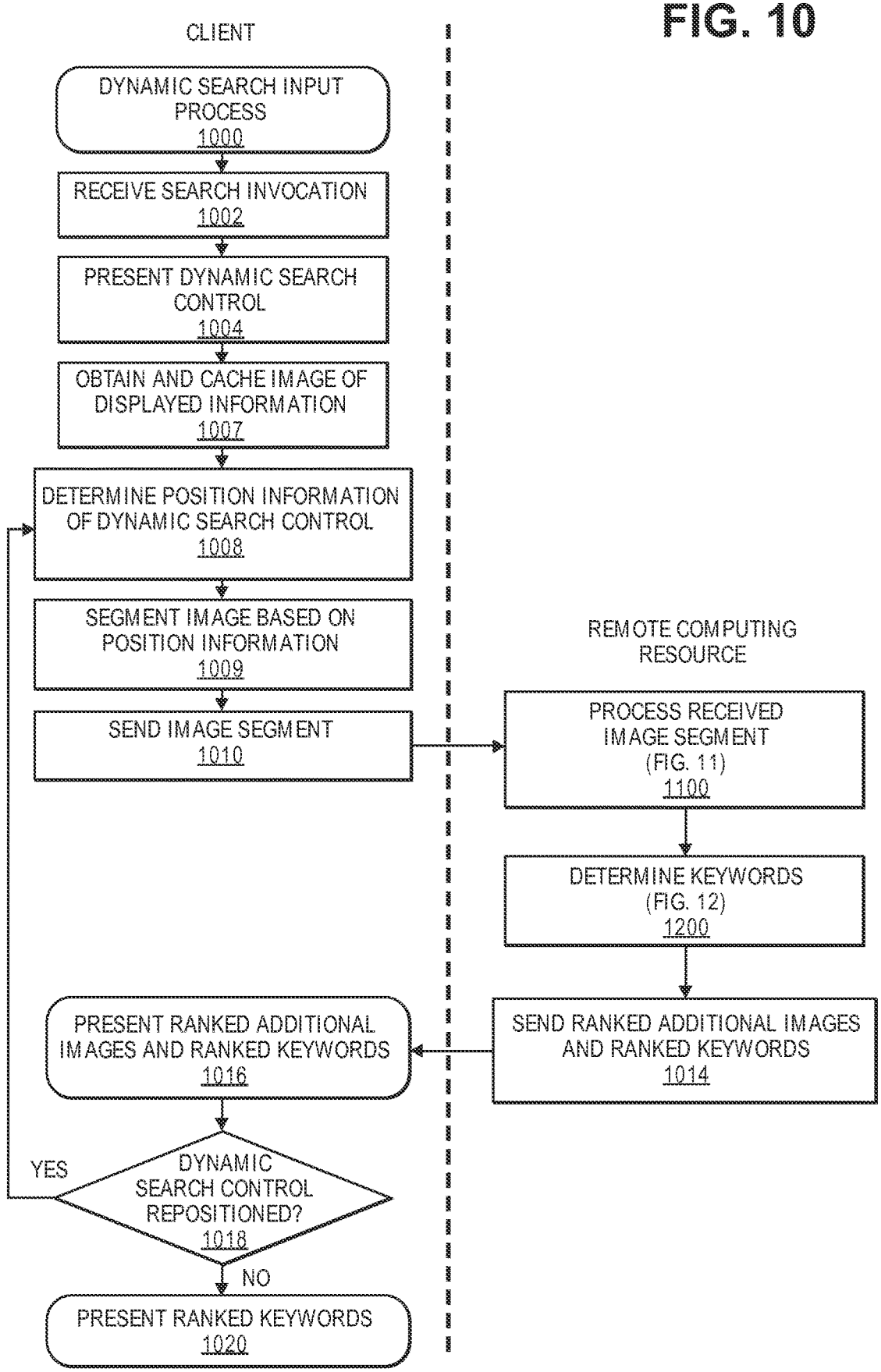
FIG. 10 is a flow diagram illustrating another example dynamic search process, according to an implementation.

FIG. 10 is a flow diagram illustrating another example dynamic search process 1000, according to an implementation. The example process 1000 begins upon receipt of an invocation or request to initiate a search using the dynamically adjustable search control, as in 1002. Upon receiving an invocation, the dynamic search control is presented on a user interface such that it appears to be positioned over the displayed information that is presented on the user interface, as in 1004. For example, a portion of the displayed information that is not encompassed by the search control may be obfuscated, greyed out, hidden from view, etc., such that the dynamic search control and the portion of the displayed information that is encompassed by the search control are distinguished. In other implementations, the portion of the displayed information that is encompassed by the search control may be highlighted, magnified, or otherwise distinguished from other portions of the displayed information so that a user can discern which portion of the displayed information is encompassed by the search control.

A user may interact with the search control by, for example, repositioning the search control to a different position on the user interface such that different portions of the displayed information are encompassed by the search control. Likewise, the size and/or shape of the search control may be altered such that more or less of the displayed information is encompassed by the search control.

In addition to presenting the search control, an image of the displayed information that is presented on the user interface is obtained and cached or otherwise stored in a memory on the client device, as in 1007. In some implementations, an image of the displayed information is obtained and cached when the search control invocation is received (block 1002). In other implementations, the image of the displayed information is obtained and cached each time an image segment is to be generated as the search control is moved by a user.

In addition to obtaining an image of the displayed information, position information corresponding to the search control is determined, as in 1008. The position information includes the size, shape and/or dimensions of the search control and the horizontal and vertical position of the search control on the user interface and/or with respect to the displayed information. For example, a center point of the search control may be determined, a horizontal and vertical position of the center point on the user interface determined, and dimensions (e.g., height, width, shape) of the search control determined with respect to the center point. In another example, the perimeter or perimeter points of the search control may be determined in horizontal and vertical positions with respect to the user interface.

Based on the position information, the obtained image of the displayed information is segmented, as in 1009. Specifically, an image segment that includes the portion of the obtained image corresponding to the encompassed displayed information is generated from the obtained and cached image of the displayed information. The image segment is then sent to the remote computing resource, as in 1010. In some implementations, rather than generating the image segment on the client device, the entire obtained image of the displayed information may be sent to the remote computing resource and the remote computing resource may generate the image segments. In such an implementation, each time position information of the search control is determined, the position information is sent to the remote computing resource and the remote computing resource uses the received position information and the obtained image of the displayed information to generate an image segment.

The remote computing resource processes the image segment to determine an object represented in the image segment and a plurality of additional images that include representations of objects that are visually similar to the object represented in the image segment, as in 1100. Processing of the image segment is discussed in further detail below with respect to FIG. 11. Likewise, one or more keywords that are associated with the additional images may also be determined, as in 1200. Determination of keywords is discussed in further detail below with respect to FIG. 12.

The ranked additional images that are returned by the example process 1100 and the ranked keywords that are returned by the example process 1200 are sent by the remote computing resource to the client device, as in 1014. In some implementations, all of the additional images and/or additional keywords that are returned by the example process 1100 and the example process 1200 may be sent to the client device. In other implementations, only a portion of the additional images and/or additional keywords may be sent to the client device and the remote computing resource may maintain a record of all of the additional images and/or all of the additional keywords and an indication of which additional images and/or additional keywords have been sent to the client device.

Finally, the client device, upon receiving the additional images and/or additional keywords, presents the additional images, as in 1016. In addition to presenting the additional images, a determination is made as to whether the dynamic search control has been repositioned, as in 1018. If it is determined that the dynamic search control has been repositioned, the example process 1000 returns to block 1008 and continues, thereby updating the additional images that are presented to the user to correspond to the representation of the object encompassed by the repositioned search control. If it is determined that the dynamic search control has not been repositioned, the ranked keywords are presented to the user, as in 1020. In some implementations, there may be a delay before it is determined that the search control has not been repositioned and before the keywords are presented. For example, the example process may include a two second delay before it is determined that the search control has not been repositioned and the keywords are presented. In some implementations, the image segment, the search control, and/or the displayed information may also be presented along with the additional images and/or additional keywords.

Figure 11:
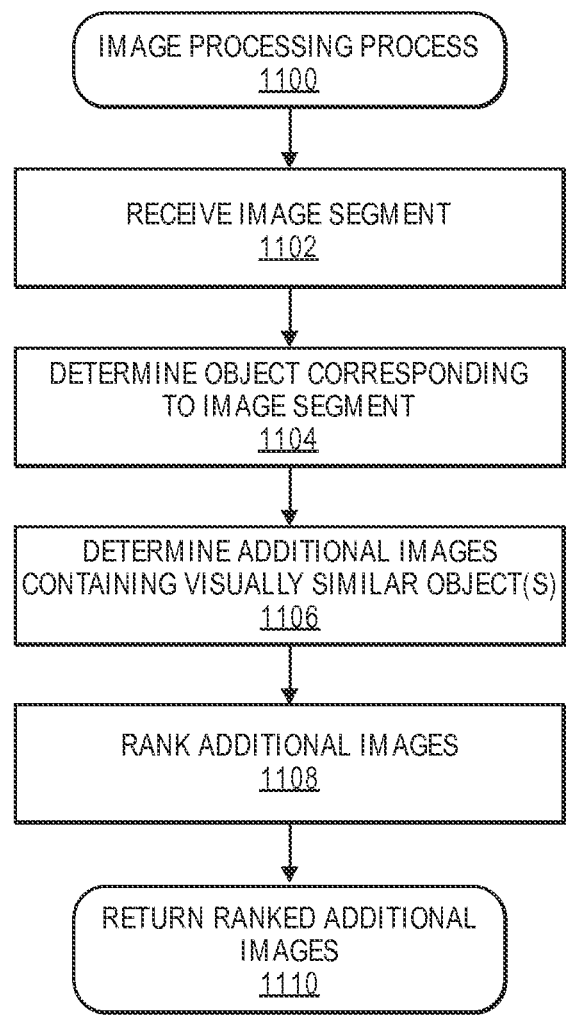
FIG. 11 is a flow diagram illustrating an example image search processing process, according to an implementation.

FIG. 11 is a flow diagram illustrating an example image processing process 1100, according to an implementation. The example process 1100 begins upon receipt of an image segment, as in 1102. As discussed above, an image segment is determined to correspond to a portion of displayed information of a user interface that is encompassed by a dynamically positionable search control.

The received image segment is processed to determine an object represented in the image segment, as in 1104. One or more techniques may be utilized to determine the object represented in the image segment. For example, one or more of an object detection algorithm, edge detection algorithm, etc., may be used to detect the object. In other implementations, a color histogram or color signature corresponding to the object represented in the image and/or the image segment may be determined and utilized as representative of the object represented in the image. In some implementations, techniques described in commonly owned U.S. patent application Ser. No. 14/279,871, entitled "Image Based Search," the contents of which are incorporated by reference herein in their entirety, may be used to determine the object represented in the image segment.

Based on the determined object, one or more additional images containing visually similar objects may be determined, as in 1106. For example, images maintained in a data store by the remote computing resource may be processed using similar object detection techniques and indexed by object type, shape, size, color, brand, etc. When the object represented in the image segment is determined, it may be compared with the index maintained by the remote computing resource to determine additional images that include objects having the same or similar type, shape, size, color, brand, etc. Additional images with objects determined to be visually similar may be ranked or weighted based on how visually similar the representation of the object in the image segment is to the object represented in the additional image. For example, a single feature vector of the object represented in the image segment may be compared to feature vectors of the visually similar objects to determine a similarity between the objects.

Based on the similarity scores of the additional images, the additional images are ranked, as in 1108, and the highest ranked images are returned, as in 1110. In some implementations, only a portion of an image with a visually similar object may be returned as an additional image. For example, only the segment of the additional image that includes the visually similar object may be returned. In other implementations, the entire additional image containing the visually similar object may be returned. Likewise, the additional images may be returned in an ordered set corresponding to the ranking and/or an additional images ranking or additional images ranking list may be provided with the additional images.

As discussed above, in some implementations, one or more keywords may also be determined that are also presented to the user. In such implementations, the example process 1200 (FIG. 12) may be performed to determine the additional keywords. The example process 1200, illustrated in FIG. 12, begins by determining each of the keywords associated with the additional images determined by the example process 1100 (FIG. 11), as in 1202. For example, some or all of the additional images may have one or more keywords, attributes, metadata, descriptions, etc., that may be analyzed and used as keywords. For each determined keyword, a frequency or count is determined based on how many of the additional images are associated with each keyword. For example, if the keyword "Leggings" is associated with 115 out of 900 additional images, the keyword "Leggings" will have a frequency or count representative of the 115 times it is associated with the 900 additional images.

The keywords are then ranked based on the determined frequency for each keyword, as in 1204, and the ranked keywords are returned, as in 1206. In some implementations, all of the additional keywords may be returned in a ranked order. In other implementations, only a portion of the ranked keywords may be returned. Likewise, the keywords may be returned in an ordered set corresponding to the ranking and/or returned with a keyword ranking or keyword ranking list for the keywords. In some implementations, the keyword ranking list may identify each of the keywords along with a frequency of use of each keyword.

Figure 13:
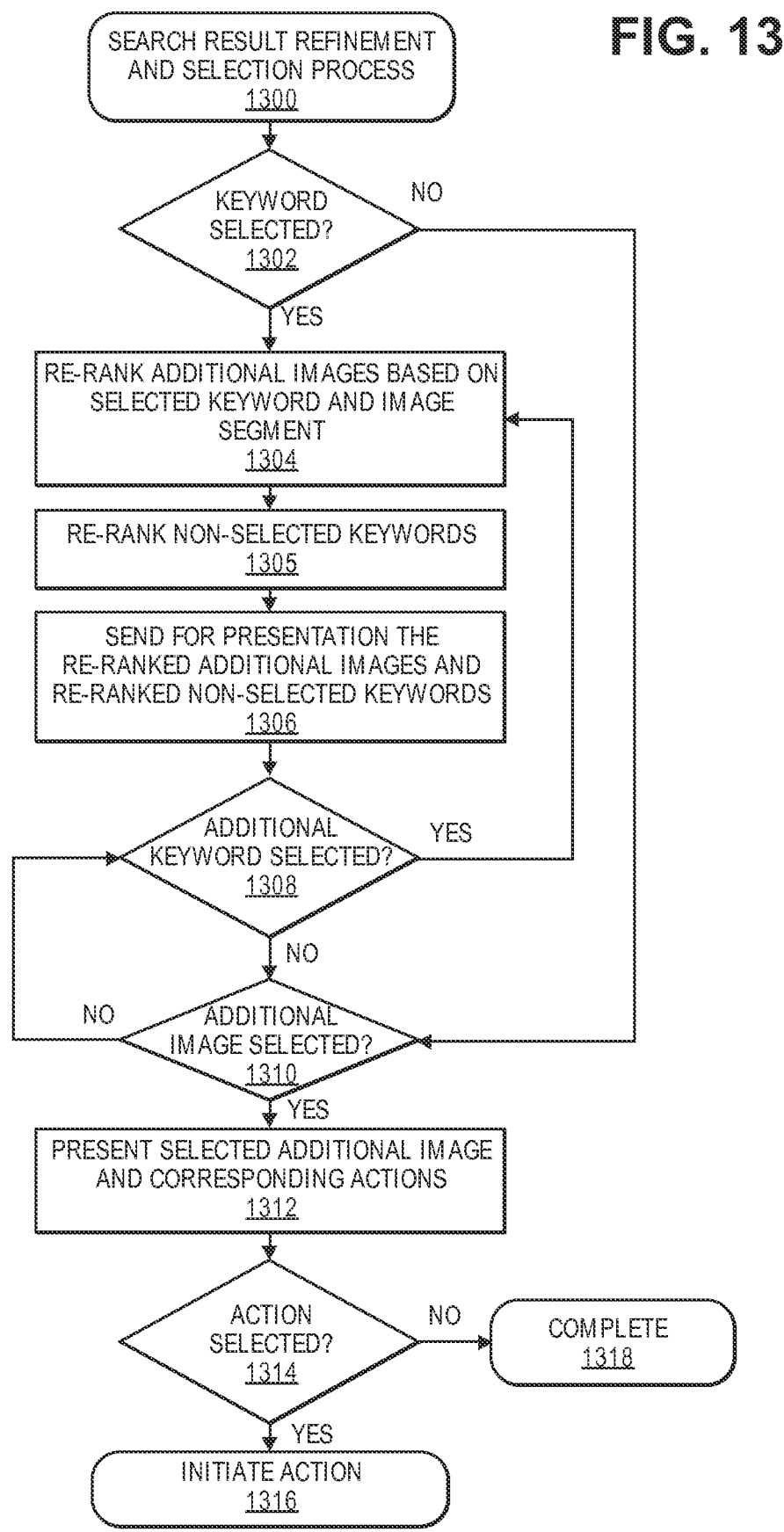
FIG. 13 is a flow diagram illustrating an example search result refinement and selection process.

FIG. 13 is a flow diagram illustrating an example search result refinement and selection process 1300, according to an implementation. The example process 1300 begins by determining if a presented keyword has been selected, as in 1302. If it is determined that a keyword has been selected, the determined additional images are re-ranked based on the selected keyword and the similarity of the additional images with the image segment, as in 1304. For example, additional images with the selected keyword(s) associated therewith are given a higher weight than other additional images such that they are ranked higher than the other additional images. Likewise, for additional images that include an association with the selected keyword(s), those additional images are ranked according to their similarity with the image segment, such that the additional image with the associated keyword and the highest visual similarity will be ranked highest.

In addition to re-ranking the additional images based on a selected keyword, the keywords may also be re-ranked, as in 1305. For example, the set of keywords may be reduced to only include keywords associated with additional images that are associated with the selected keyword. In such an example, the reduced set of keywords may then be re-ranked based on the frequency in which those keywords are associated with the additional images. In one example, the frequency of the reduced set of keywords may be determined based on all of the additional images. In another example, the frequency of the reduced set of keywords may be determined based only on the additional images that are associated with the selected keyword. The re-ranked images and/or re-ranked non-selected keywords are then sent and presented to the user, as in 1306.

In some implementations, the process of re-ranking the additional images and/or re-ranking the keywords may be performed on the client device. In other implementations, the re-ranking of the additional images and/or the keywords may be performed at the remote computing resource. For example, if the client device has received all of the additional images and corresponding keywords, upon selection of a keyword, the client device may re-rank the additional images for presentation based on the selected keyword. Likewise, the client device may reduce the set of keywords and re-rank the reduced set of keywords. Alternatively, upon selection of a keyword, the client device may send an indication of the selected keyword to the remote computing resource. The remote computing resource may then re-rank the additional images based on the selected keyword, reduce the set of keywords and re-rank the reduced set of keywords and provide the client device with the re-ranked additional images and the re-ranked unselected keywords. Alternatively, the remote computing resource may provide the client device an updated additional image ranking list and/or an updated keyword ranking list indicating an order in which the additional images and/or non-selected keywords are to be presented, or a combination thereof. For example, if the remote computing resource only sent the client device the highest ranked images that were presented, upon re-ranking, the remote computing resource may determine which additional images are to be presented, determine which of those additional images have already been sent to the client device, and provide the client device with an updated additional images ranking list and any additional images that are to be presented according to the updated additional images ranking list. The client device, upon receiving the updated additional images ranking list and any additional images that it did not already have, re-orders and presents the additional images according to the updated additional images ranking list. In a similar manner, the presentation of the keywords may likewise be updated.

Returning to FIG. 13, a determination is then made as to whether an additional keyword has been selected, as in 1308. If it is determined that an additional keyword has been selected, the example process 1300 returns to block 1304 and continues, considering each selected keyword and the visual similarities between the additional images and the image segment.

If it is determined that no additional keywords have been selected at decision block 1308, or if it is determined at decision block 1302 that no keyword has been selected, a determination is made as to whether an additional image is selected, as in 1310. If it is determined that an additional image has not been selected, the example process 1300 returns to decision block 1308 and continues. If it is determined that an additional image has been selected, the selected additional image and one or more corresponding actions are presented, as in 1312. For example, the selected additional image may be presented in a larger size and/or with additional information about the selected additional image. Likewise, the one or more corresponding actions may be presented as controls that may be selected or initiated by the user. Example actions include, but are not limited to, initiating a purchase of an object represented in the image, sharing the image, saving the image, emailing the image, obtaining additional information about the image and/or the object represented in the image, etc. In some implementations, upon selection of an action, the client device may provide an indication of the selected action to the remote computing resource and the remote computing resource may initiate the selected action.

A determination is then made as to whether one of the presented actions is selected, as in 1314. If it is determined that an action has been selected, the selected action is initiated, as in 1316. If it is determined that an action has not been selected, the example process 1300 completes, as in 1318. A user may select one or more of the actions and the corresponding action is initiated with respect to the selected additional image. For example, if the user selects the buy or purchase action, the action of purchasing the object represented in the additional image, or purchase of the additional image, is initiated. Initiation of the action may include obtaining additional details regarding the represented object, providing price information, seller information, shipping details, etc. As will be appreciated, any variety of actions may be associated with one or more of the additional images and those actions may be initiated with respect to a selected additional image.

Figure 14:
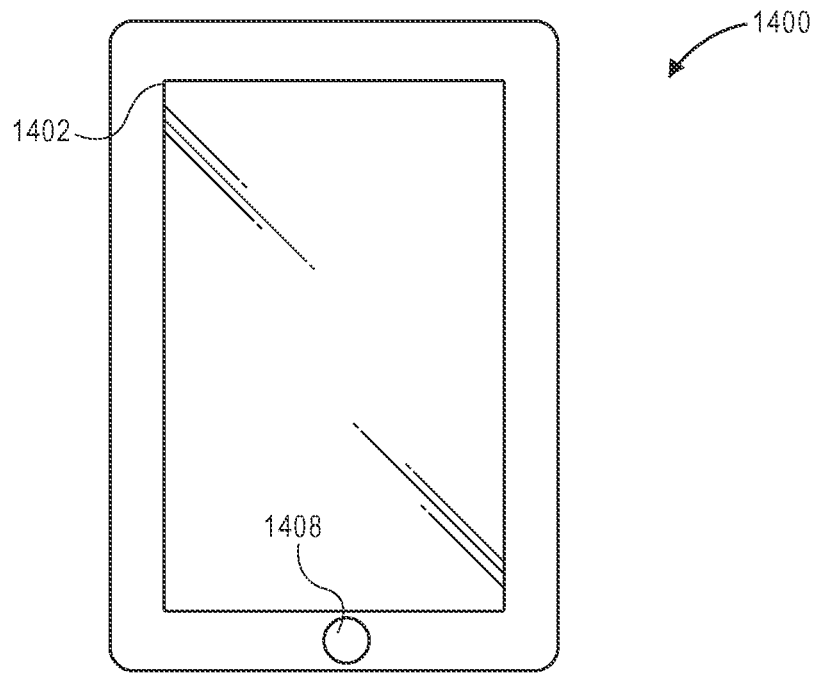
FIG. 14 illustrates an example computing device, according to an implementation.

FIG. 14 illustrates an example client device 1400 that can be used in accordance with various implementations described herein. In this example, the client device 1400 includes a display 1402 and optionally at least one input component, such as a camera, on a same side of the device as the display 1402. The client device 1400 may also include an audio transducer, such as a speaker, and optionally a microphone. Generally, the client device 1400 may have any form of input/output components that allow a user to interact with the client device 1400, such as a mechanical control 1408. Various other input components for enabling user interaction with the device may include a touch-based display 1402 (e.g., resistive, capacitive), camera (for gesture tracking, etc.), microphone, global positioning system (GPS), compass or any combination thereof. One or more of these input components may be included on a device or otherwise in communication with the device. Other input components and combinations of input components can be used as well within the scope of the various implementations as should be apparent in light of the teachings and suggestions contained herein.

Figure 15:
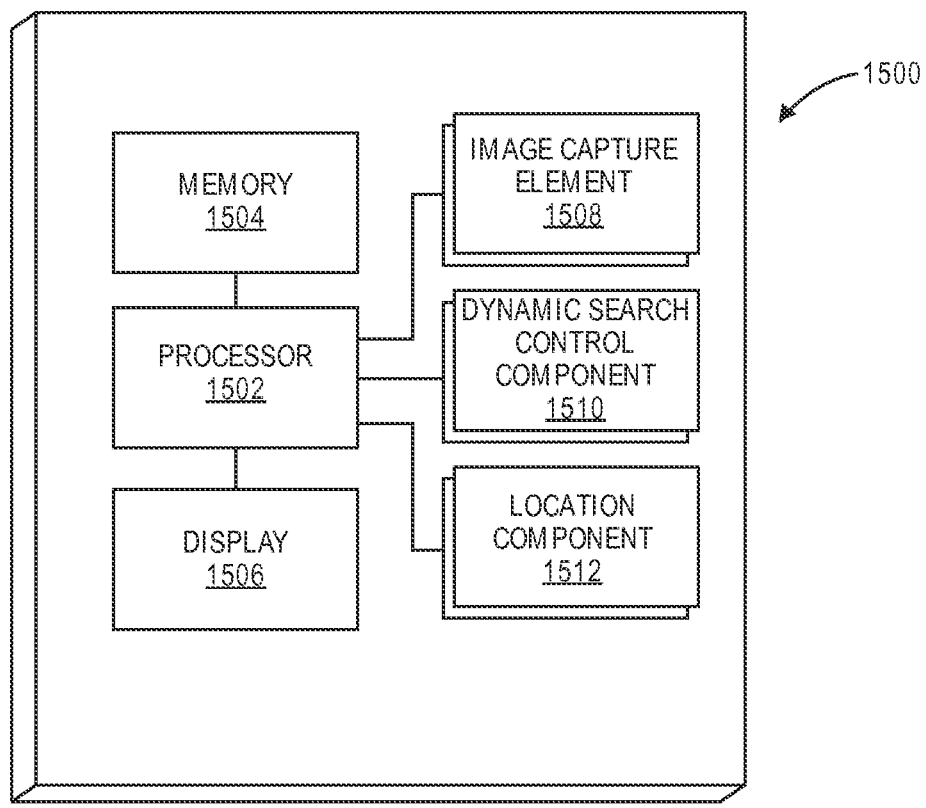
FIG. 15 illustrates an example configuration of components of a computing device, such as that illustrated in FIG. 14.

In order to provide the various functionality described herein, FIG. 15 illustrates an example set of basic components 1500 of a client device 1400, such as the client device 1400 described with respect to FIG. 14 and discussed herein. In this example, the device includes at least one central processor 1502 for executing instructions that can be stored in at least one memory device or element 1504. As would be apparent to one of ordinary skill in the art, the device can include many types of memory, data storage or computer-readable storage media, such as a first data storage for program instruction for execution by the processor 1502.

The memory 1504 may be a non-transitory computer readable storage medium configured to store executable instructions accessible by the processor(s) 1502. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium, such as a network and/or a wireless link, such as may be implemented via a network interface.

Removable storage memory may also be available for sharing information with other devices, etc. The device typically will include some type of display 1506, such as a touch-based display, electronic ink (e-ink), organic light emitting diode (OLED), or liquid crystal display (LCD). The device in some implementations may include at least one image capture element 1508, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one dynamic search control component 1510 for invoking the dynamic search control, receiving adjustments to the position, size, and/or shape of the dynamic search control, obtaining an image of the displayed information, and/or segmenting the image. The device also can include at least one location component 1512, such as GPS, NFC location tracking or Wi-Fi location monitoring.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 16:
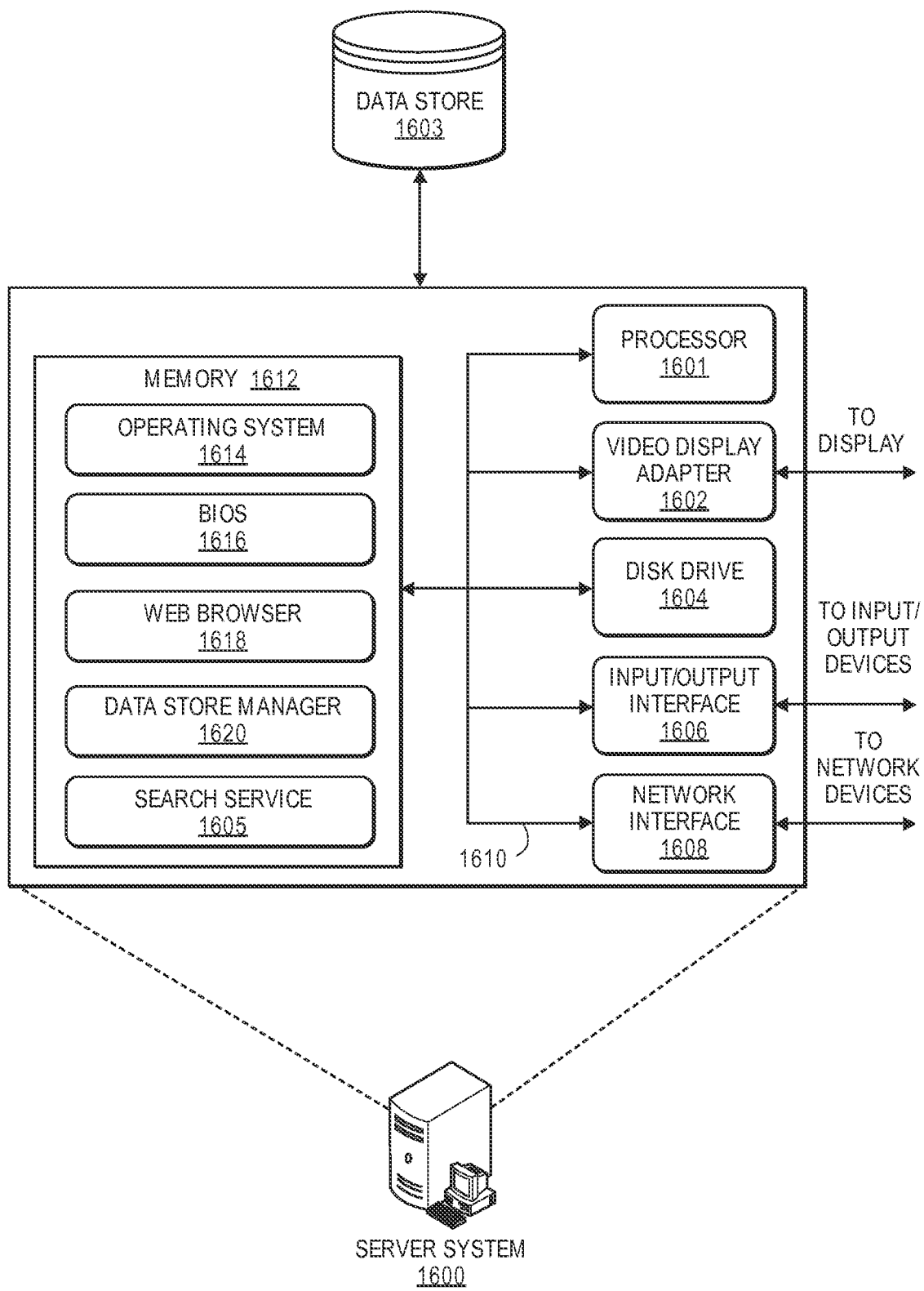
FIG. 16 is a pictorial diagram of an illustrative implementation of a server system that may be used for various implementations.

FIG. 16 is a pictorial diagram of an illustrative implementation of a server system 1600, such as a remote computing resource, that may be used with one or more of the implementations described herein. The server system 1600 may include a processor 1601, such as one or more redundant processors, a video display adapter 1602, a disk drive 1604, an input/output interface 1606, a network interface 1608, and a memory 1612. The processor 1601, the video display adapter 1602, the disk drive 1604, the input/output interface 1606, the network interface 1608, and the memory 1612 may be communicatively coupled to each other by a communication bus 1610.

The video display adapter 1602 provides display signals to a local display (not shown in FIG. 16) permitting an operator of the server system 1600 to monitor and configure operation of the server system 1600. The input/output interface 1606 likewise communicates with external input/output devices not shown in FIG. 16, such as a mouse, keyboard, scanner, or other input and output devices that can be operated by an operator of the server system 1600. The network interface 1608 includes hardware, software, or any combination thereof, to communicate with other computing devices. For example, the network interface 1608 may be configured to provide communications between the server system 1600 and other computing devices, such as the client device 1400 (FIG. 14).

The memory 1612 may be a non-transitory computer readable storage medium configured to store executable instructions accessible by the processor 1601. In various implementations, the non-transitory computer readable storage medium may be implemented using any suitable memory technology, such as SRAM, SDRAM, nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium, such as a network and/or a wireless link, such as may be implemented via a network interface.

The memory 1612 is shown storing an operating system 1614 for controlling the operation of the server system 1600. A binary input/output system (BIOS) 1616 for controlling the low-level operation of the server system 1600 is also stored in the memory 1612. The memory 1612 additionally stores program code and data for providing network services that allow client devices 1400 and external sources to exchange information and data files with the server system 1600. Accordingly, the memory 1612 may store a browser application 1618. The browser application 1618 comprises computer executable instructions, that, when executed by the processor 1601, generate or otherwise obtain configurable markup documents such as Web pages. The browser application 1618 communicates with a data store manager application 1620 to facilitate data exchange and mapping between the data store 1603, client devices, such as the client device 1400, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1600 can include any appropriate hardware and software for integrating with the data store 1603 as needed to execute aspects of one or more applications for the client device 1400, the external sources and/or the search service 1605. The server system 1600 provides access control services in cooperation with the data store 1603 and is able to generate content such as matching search results, images containing visually similar objects, indexes of images having visually similar objects, keywords, and the like.

The data store 1603 can include several separate data tables, databases or other data storage mechanisms and media for storing data relating to a particular aspect. For example, the data store 1603 illustrated includes digital items (e.g., images) and corresponding metadata (e.g., indexes, keywords) about those images. Search history, user preferences, profiles and other information may likewise be stored in the data store.

It should be understood that there can be many other aspects that may be stored in the data store 1603, which can be stored in any of the above listed mechanisms as appropriate or in additional mechanisms of any of the data store. The data store 1603 may be operable, through logic associated therewith, to receive instructions from the server system 1600 and obtain, update or otherwise process data in response thereto.

The memory 1612 may also include the search service 1605. The search service 1605 may be executable by the processor 1601 to implement one or more of the functions of the server system 1600. In one implementation, the search service 1605 may represent instructions embodied in one or more software programs stored in the memory 1612. In another implementation, the search service 1605 can represent hardware, software instructions, or a combination thereof. The search service, as discussed above, is configured to receive image segments from client devices, process those image segments to determine an object represented in the image segment, determine additional images that include representations of visually similar objects, and/or determine keywords corresponding to the additional images. Likewise, the search service 1605 may determine a ranking for the additional images, such as an additional image ranking list, based on the similarity of each additional image or the object represented therein to the image segment and/or the object represented in the image segment. Likewise, the search service may rank the determined keywords based on a frequency with which each keyword is associated with the additional images.

The server system 1600, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction in FIG. 16 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method as carried out through execution of executable instructions by one or more processors of a computing device, the method comprising:
   receiving, from a device, a search invocation; and
   in response to receiving the search invocation:
      causing one or more search results responsive to the search invocation to be displayed on a display of the computing device, wherein the one or more search results is displayed information;
      causing a dynamic search control to be presented on the display of the computing device and visually positioned over the displayed information concurrently displayed on the display of the computing device, wherein:
         the dynamic search control comprises an area through which a first portion of the displayed information concurrently displayed on the display of the computing device is unobstructed, and
         the dynamic search control is user-interactive such that a user may dynamically position the concurrent presentation of the dynamic search control over any portion of the displayed information,
      receiving, from the computing device, an indication of an area encompassed by the dynamic search control;
      generating an image segment of the displayed information encompassed by the area of the dynamic search control;
      processing the image segment to determine a first object at least partially represented in the image segment;
      determining, based at least in part on comparisons of a first vector associated with the first object and a plurality of second vectors associated with a first plurality of additional images, a visual similarity score for each of the first plurality of additional images;
      determining, from the first plurality of additional images and based at least in part on the visual similarity scores, a second plurality of additional images that include a representation of an additional object that is visually similar to the first object;
      determining a plurality of keywords, wherein each of the plurality of keywords is associated with at least one of the second plurality of additional images;
      determining a ranking of the plurality of keywords based on a frequency that the plurality of keywords are associated with the second plurality of additional images;
      causing at least a portion of the second plurality of additional images to be concurrently presented on the display of the computing device as additional search results with the dynamic search control and the displayed information;
      causing at least a first portion of the plurality of keywords to be presented in accordance with the ranking and concurrently on the display of the computing device with the at least the portion of the second plurality of additional images;
obtaining a selection of at least one of the plurality of keywords;
determining a re-ranking of the plurality of keywords based on the selection of the at least one of the plurality of keywords; and
causing at least a second portion of the plurality of keywords to be presented in accordance with the re-ranking.

2. The computer-implemented method of claim 1, further comprising:
prior to causing the at least a portion of the second plurality of additional images to be presented, ranking the second plurality of additional images based at least in part on the visual similarity scores such that the presented at least a portion of the second plurality of additional images correspond to highest ranked images.

3. The computer-implemented method of claim 2, further comprising:
subsequent to causing the at least a portion of the plurality of keywords to be presented, receiving a selection of a keyword of the at least a portion of the plurality of keywords; and
re-ranking the second plurality of additional images based at least in part on the keyword; and
causing a presentation on the display of a re-ranked portion of the second plurality of additional images, the re-ranked portion of the second plurality of additional images having an association with the keyword.

4. The computer-implemented method of claim 1, further comprising:
subsequent to causing the at least a portion of the second plurality of additional images to be presented, receiving a selection of an image from the presented at least a portion of the second plurality of additional images;
causing a presentation on the display of a plurality of actions that may be initiated with respect to the image;
receiving a selection of an action of the plurality of actions; and
causing an initiation of the action.

5. The computer-implemented method of claim 1, further comprising:
receiving, from the computing device, a second indication of a user change to the dynamic search control corresponding to a change in at least one of a size, a shape, or a position of the dynamic search control on the display;
generating a second image segment corresponding to a second area of the dynamic search control in view of the user change to the dynamic search control;
processing the second image segment to:
determine a second object at least partially represented in the second image segment; and
update the second plurality of images to include images that include a second representation of a second additional object that is visually similar to the second object; and
causing at least a portion of the updated second plurality of additional images to be concurrently presented on the display of the computing device.

6. The computer-implemented method of claim 1, wherein generating the image segment of the displayed information is based at least in part on page information associated with the displayed information.

7. The computer-implemented method of claim 1, wherein causing the dynamic search control to be presented on the display of the computing device includes partially obfuscating a second portion of the displayed information concurrently displayed on the display of the computing device that is outside the area of the dynamic search control through which the first portion of the displayed information is unobstructed.

8. A non-transitory computer-readable storage medium storing instructions that, when executed by a processor, cause the processor to at least:
visually present a dynamic search control on a display concurrent with displayed information also displayed on the display, wherein:
the dynamic search control is visually presented over the displayed information and comprises an area through which a first portion of the displayed information is visually unobstructed;
the area of the dynamic search control encompasses less than all of the displayed information, and
the concurrent presentation of the dynamic search control may be dynamically positioned by a user over any portion of the displayed information;
receive an indication of a user-initiated change of the concurrent presentation of the dynamic search control with respect to the displayed information;
determine a current position of the concurrent presentation of the dynamic search control with respect to the displayed information;
determine an image segment of the displayed information corresponding to a portion of the displayed information encompassed by the area of the dynamic search control at the current position;
process the image segment to determine a first object represented in the image segment;
determine, based at least in part on comparisons of a first vector associated with the first object and a plurality of second vectors associated with a first plurality of additional images, a visual similarity score for each of the first plurality of additional images;
determine, from the first plurality of additional images and based at least in part on the visual similarity scores, a second plurality of additional images that include a representation of an additional object that is visually similar to the first object;
determine a plurality of keywords, where each of the plurality of keywords is associated with at least one of the second plurality of additional images;
determine a ranking of the plurality of keywords based on a frequency that the plurality of keywords are associated with the second plurality of additional images;
present, on the display, at least a portion of the second plurality of additional images concurrent with the dynamic search control and the displayed information;
present, on the display and concurrently with the at least the portion of the second plurality of additional images, at least a first portion of the plurality of keywords in accordance with the ranking;
obtain a selection of at least one of the plurality of keywords;
determine a re-ranking of the plurality of keywords based on the selection of the at least one of the plurality of keywords; and
present, on the display, at least a second portion of the plurality of keywords to be presented in accordance with the re-ranking.

9. The non-transitory computer-readable storage medium of claim 8, wherein an object is determined to be visually similar to the first object based at least in part on a shape, a size, a color, or a brand of the object.

10. The non-transitory computer-readable storage medium of claim 8, wherein the instructions that, when executed by the processor to cause the dynamic search control to be presented, further include instructions that cause the processor to at least:
cause the concurrent presentation of the dynamic search control to be presented with a substantially circular shape, such that a radius of the substantially circular shape is adjustable.

11. The non-transitory computer-readable storage medium of claim 8, wherein the current position of the concurrent presentation of the dynamic search control includes a horizontal position with respect to the displayed information, a vertical position with respect to the displayed information, a height, and a width.

12. The non-transitory computer-readable storage medium of claim 8, wherein the instructions, when executed by the processor, further cause the processor to at least:
obtain an image of the displayed information that is visually unobstructed and without including the dynamic search control; and
store the image in a memory.

13. The non-transitory computer-readable storage medium of claim 12, wherein the instructions, when executed by the processor, further cause the processor to at least:
obtain the image segment from the stored image of the displayed information such that the image segment corresponds to the current position of the concurrent presentation of the dynamic search control with respect to the displayed information as represented in the stored image.

14. The non-transitory computer-readable storage medium of claim 13, wherein the image segment is less than the entire stored image.

15. A computing system, comprising:
a processor; and
a memory coupled to the processor and storing program instructions that when executed by the processor, cause the processor to at least:
visually present one or more search results on a display in response to a search query, the one or more search results being displayed information;
receive a request to present a dynamic search control;
in response to receiving the request, visually present, on the display, the dynamic search control concurrently with the displayed information such that:
the dynamic search control is visually presented over the displayed information and comprises an area through which a first portion of the displayed information is visually unobstructed; and
the concurrent presentation of the dynamic search control may be positioned at any location over the displayed information;
subsequent to visually presenting the dynamic search control on the display, receive a user-initiated change of the concurrent presentation of the dynamic search control, the user-initiated change comprising at least one of a position input change or a size input change corresponding to an updated position of the concurrent presentation or an updated size of the area of the dynamic search control on the display;
dynamically determine a current position of the concurrent presentation and a current size of the area of the dynamic search control on the display according to the user-initiated change;
adjust the visual presentation of the concurrent presentation of the dynamic search control according to the received at least one of the updated position of the concurrent presentation or the updated size of the area of the dynamic search control on the display;
determine an image segment of the displayed information corresponding to the updated position of the concurrent presentation and the updated size of the area of the dynamic search control after the visual presentation of the concurrent presentation of the dynamic search control is adjusted on the display, wherein the image segment includes less than all of the displayed information;
send to a remote computing resource the image segment of the displayed information to process the image segment to determine an object represented in the image segment;
receive, from the remote computing resource, a plurality of ranked additional images not included in the search results of the displayed information that include a representation of additional objects that are visually similar to the object represented in the image segment from the stored image, wherein the plurality of ranked additional images are determined based on a comparison of a first vector associated with the object and a plurality of second vectors associated with the plurality of ranked additional images;
determine a plurality of keywords, where each of the plurality of keywords is associated with at least one of the plurality of ranked additional images;
determine a ranking of the plurality of keywords based on a frequency that the plurality of keywords are associated with the plurality of ranked additional images;
present, on the display, at least some of the plurality of ranked additional images concurrent with the dynamic search control and the displayed information;
present, on the display and concurrently with the at least some of the plurality of ranked additional images, at least a first portion of the plurality of keywords in accordance with the ranking;
obtain a selection of at least one of the plurality of keywords;
determine a re-ranking of the plurality of keywords based on the selection of the at least one of the plurality of keywords; and
present, on the display, at least a second portion of the plurality of keywords to be presented in accordance with the re-ranking.

16. The computing system of claim 15, wherein the program instructions that when executed by the processor, further cause the processor to at least:
receive a selection of a keyword from the presented at least a portion of the plurality of keywords;
send the selected keyword to the remote computing resource;
subsequent to sending the selected keyword, receive, from the remote computing resource, a second ranking of the plurality of additional images; and
present, on the display, at least some of the plurality of additional images according to the second ranking.

17. The computing system of claim 15, wherein the program instructions that when executed by the processor, further cause the processor to at least:
- receive a selection of an image of the presented at least some of the plurality of additional images;
- present, on the display, a plurality of actions that may be initiated with respect to the selected image;
- receive a selection of an action from the plurality of actions; and
- cause the action to be initiated.

18. The computing system of claim 17, wherein the plurality of actions include at least two of: an action to share the image, an action to purchase an object represented in the image, an action to store the image, or an action to send the image.

19. The computing system of claim 15, wherein the displayed information may be any visual information that is presented to a user, including: a web page, an email, a video, an image, or a presentation generated by a computing program.

\* \* \* \* \*